United States Patent
Uoshita

(10) Patent No.: US 12,448,095 B2
(45) Date of Patent: Oct. 21, 2025

(54) NAVIGATION ROUTE PLANNING APPARATUS AND NAVIGATION ROUTE PLANNING METHOD

(71) Applicant: Furuno Electric Co., Ltd., Nishinomiya (JP)

(72) Inventor: Seiichi Uoshita, Nishinomiya (JP)

(73) Assignee: FURUNO ELECTRIC CO., LTD., Nishinomiya (JP)

( * ) Notice: Subject to any disclaimer, the term of this patent is extended or adjusted under 35 U.S.C. 154(b) by 258 days.

(21) Appl. No.: 18/207,142

(22) Filed: Jun. 8, 2023

(65) Prior Publication Data

US 2023/0406461 A1 Dec. 21, 2023

(30) Foreign Application Priority Data

Jun. 10, 2022 (EP) .................................... 22178460

(51) Int. Cl.
*G08G 3/02* (2006.01)
*B63B 43/18* (2006.01)
*B63B 49/00* (2006.01)

(52) U.S. Cl.
CPC .............. *B63B 43/18* (2013.01); *B63B 49/00* (2013.01); *G08G 3/02* (2013.01)

(58) Field of Classification Search
CPC ......... B63B 43/18; B63B 49/00; B63B 51/00; B63B 79/40; G01C 21/203; G08G 3/02
USPC .............................. 340/984; 342/41; 701/21
See application file for complete search history.

(56) References Cited

U.S. PATENT DOCUMENTS

| | | | |
|---|---|---|---|
| 2009/0167592 A1 | 7/2009 | Kao et al. | |
| 2009/0315756 A1* | 12/2009 | Imazu | B63B 49/00 342/41 |
| 2017/0067984 A1* | 3/2017 | Nakahama | G01S 7/24 |

(Continued)

FOREIGN PATENT DOCUMENTS

| | | | | |
|---|---|---|---|---|
| CN | 114861547 A * | 8/2022 | .......... | G06F 18/2411 |
| EP | 4597036 A1 * | 8/2025 | .......... | G01C 21/203 |
| JP | H10-175597 A | 6/1998 | | |

(Continued)

OTHER PUBLICATIONS

Imazu, Hayama. "Evaluation method of collision risk by using true motion." TransNav: International Journal on Marine Navigation and Safety of Sea Transportation 11.1 (2017): 65-70. (Year: 2017).*

(Continued)

*Primary Examiner* — Cuong H Nguyen
(74) *Attorney, Agent, or Firm* — XSENSUS LLP

(57) ABSTRACT

A navigation route planning apparatus includes processing circuitry configured to receive a planned route indicating a route and a current course direction of a movable body, receive movable body information that includes a position, a travelling direction, and a speed of the own ship, receive obstacle information that includes a position, a traveling direction, and a speed of an obstacle, determine a collision risk value associated with the planned route along the current course direction based on the movable body information and the obstacle information, and determine whether the movable body requires to at least one of evade the planned route and continue traversing on the planned route based on the collision risk value.

20 Claims, 22 Drawing Sheets

(56) References Cited

U.S. PATENT DOCUMENTS

2020/0310434 A1   10/2020   Chung et al.
2021/0125502 A1*   4/2021   Mansor ................. G05D 1/693

FOREIGN PATENT DOCUMENTS

| | | | | |
|---|---|---|---|---|
| JP | 2020118459 A | * | 8/2020 | |
| JP | 2024004351 A | * | 1/2024 | ............... G08G 3/00 |
| WO | 2017/129859 A1 | | 8/2017 | |
| WO | 2017/167905 A1 | | 10/2017 | |
| WO | WO-2020003856 A1 | * | 1/2020 | ............... B41J 29/38 |
| WO | WO-2020008776 A1 | * | 1/2020 | |
| WO | WO-2024236945 A1 | * | 11/2024 | ............... G08G 3/00 |

OTHER PUBLICATIONS

Liu, Dongdong, and Guoyou Shi. "Ship collision risk assessment based on collision detection algorithm." IEEE Access 8 (2020): 161969-161980. (Year: 2020).*

Zhou, Yangyu, et al. "Research on Time Characteristics of Near Miss in Bohai Sea." IEEE Access 8 (2020): 207717-207735. (Year: 2020).*

Zhang, Ke, et al. "Collision avoidance method for autonomous ships based on modified velocity obstacle and collision risk index." Journal of advanced transportation 2022.1 (2022): 1534815. (Year: 2022).*

Liu, Qi, et al. "Regional Ship Collision Risk Assessment: An Integrated Approach Using Velocity Obstacle and Complex Network." IEEE Transactions on Intelligent Transportation Systems (2024). (Year: 2024).*

Zhen R, Shi Z, Shao Z, Liu J. A novel regional collision risk assessment method considering aggregation density under multi-ship encounter situations. The Journal of Navigation. Jan. 2022;75(1):76-94. (Year: 2022).*

Ma, Wenyao, Hongbo Wang, and Shengyin Wang. "Critical collision risk index based on the field theory." Journal of Marine Science and Engineering 10.11 (2022): 1748. (Year: 2022).*

* cited by examiner

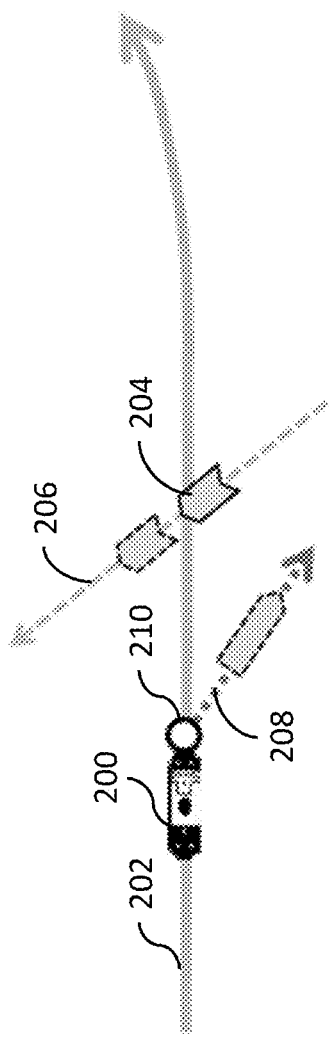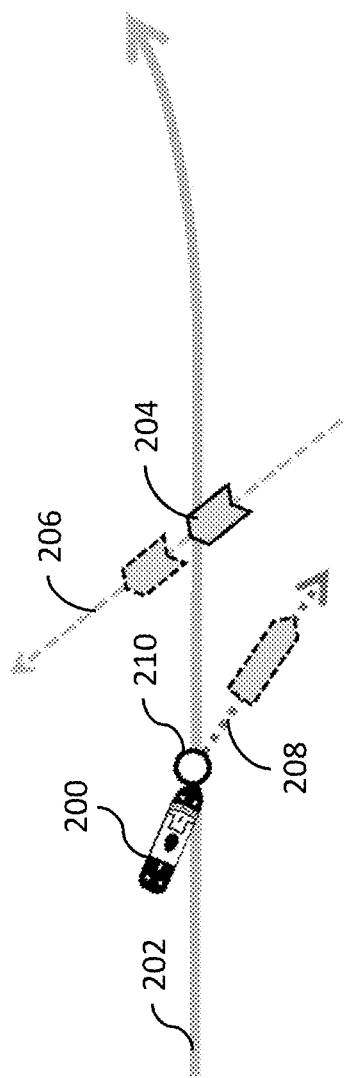

| Potential evasive route | Collision risk value | Pass length of evasive route | Evasive traveling distance | Select result |
|---|---|---|---|---|
| A | 0.81 | 1.42 | 3.20 | Risky |
| B | 0.72 | 2.37 | 4.31 | Risky |
| ... | ... | ... | ... | ... |
| D | 0.30 | 1.35 | 2.63 | Safe, but too far away |
| E | 0.35 | 0.75 | 2.85 | Selected (Optimistic) |
| F | 0.39 | 0.50 | 1.76 | Relatively Risky |
| ... | ... | ... | ... | ... |

FIG. 14

NAVIGATION ROUTE PLANNING APPARATUS AND NAVIGATION ROUTE PLANNING METHOD

CROSS-REFERENCE TO RELATED APPLICATION

This application claims priority to European Patent Application No. 22178460.6, which was filed on Jun. 10, 2022, the entire disclosure of which is hereby incorporated by reference.

BACKGROUND

Technical Field

The present disclosure mainly relates to a marine navigation system for safely navigating a ship, and more specifically to a navigation route planning apparatus and method for safely navigating a ship by avoiding collisions with surrounding obstacles.

Description of the Related Art

In general, a movable body, such as vessel or ship, sets a planned route for navigation from a departure or source location to a destination location before initiating the navigation. Currently, the movable body may include navigation systems and devices for generating a planned route and monitoring the planned route for safely navigating the movable body. Additionally, these conventional navigation systems and devices use a plurality of sensor modules for acquiring movable body information and obstacle information in order to track and identify a position of the nearby obstacles and other ships including the movable body (or own ship) on the planned route for avoiding collisions.

However, during navigation on the planned route, there may be scenarios where the planned route has to be changed due to artificial factors, such as appearance of the nearby obstacles and other ships that may cross the planned route. In addition, natural factors, such as sudden changes in oceanographic conditions, tides, and other external disturbance factors can force a change in a navigation route from the planned route. Thus, the vessel navigating personnel might need assistance to navigate through the oceanographic conditions and tides in such a manner as to avoid collision with nearby obstacles or ships and safely navigate the movable body, such as vessel, along the planned route. For the aforementioned reasons, there is a need for providing a system and method that assists the vessel navigating personnel to safely navigate the movable body by avoiding the collisions with the obstacles and other ships.

SUMMARY

In an embodiment of the present disclosure, there is provided a navigation route planning apparatus that includes processing circuitry. The processing circuitry is configured to receive a planned route which indicates a route of a movable body (or own ship) and a current course direction from a current position of the movable body, receive movable body information that includes at least one of: a position, a travelling direction, and a speed of the movable body, receive obstacle information that includes at least one of: a position, a traveling direction, and a speed of an obstacle, determine a collision risk value associated with the planned route along the current course direction based on the movable body information and the obstacle information, and determine whether the movable body requires to at least one of: evade the planned route and continue traversing on the planned route based on the collision risk value associated with the planned route.

Additionally, or optionally, the processing circuitry is further configured to determine at least one of: a closest distance and a closest distance in a particular direction between the movable body and the obstacle based on the movable body information and the obstacle information, and also determine the collision risk value based on at least one of: the closest distance and the closest distance in a particular direction between the movable body and the obstacle.

Additionally, or optionally, the processing circuitry is further configured to determine a time required by the movable body to traverse the closest distance which is calculated based on the movable body information and the obstacle information, and also determine the collision risk value based on the closest distance and the time required by the movable body to traverse the closest distance.

Additionally, or optionally, the processing circuitry is further configured to determine a time required for the movable body to intrude into an obstacle bumper area that includes the obstacle and a surrounding area of the obstacle based on a relative speed between the movable body and the obstacle, and also determine the collision risk value based on the time required for the movable body to intrude into the obstacle bumper area.

Additionally, or optionally, the processing circuitry is further configured to determine a time required for a movable body bumper area that includes the movable body and a surrounding area of the movable body to intrude into the obstacle bumper area, and also determine the collision risk value based on the time required for the movable body bumper area to intrude into the obstacle bumper area.

Additionally, or optionally, the processing circuitry is further configured to set an evasive route in place of the planned route ahead of at least one of: the current position and a predicted position of the movable body such that the collision risk value associated with the evasive route is less than or equal to a predetermined threshold value.

Additionally, or optionally, the processing circuitry is further configured to generate a plurality of potential evasive route patterns in which a position of the movable body is an evasive starting point, determine a collision risk value for each potential evasive route pattern of the plurality of potential evasive route patterns, and also select a potential evasive route pattern from the plurality of potential evasive route patterns to be set as the evasive route based on the determined collision risk value for each potential evasive route pattern of the plurality of potential evasive route patterns.

Additionally, or optionally, the processing circuitry is further configured to determine a route length of each potential evasive route pattern, and also select the potential evasive route pattern from the plurality of potential evasive route patterns based on the determined collision risk value and the route length of each potential evasive route pattern of the plurality of potential evasive route patterns.

Additionally, or optionally, the processing circuitry is further configured to identify a return point at which the movable body returns on the planned route and generate the evasive route that connects the evasive starting point and the return point.

Additionally, or optionally, the processing circuitry is further configured to determine an evasive traveling distance from the evasive starting point to the return point on the planned route, and select the potential evasive route pattern from the plurality of potential evasive route patterns based on the determined collision risk value and the route length of each potential evasive route pattern of the plurality of potential evasive route patterns, and the evasive traveling distance.

Additionally, or optionally, the obstacle information acquiring module is further configured to receive obstacle information that includes at least one of: a position, a traveling direction, and a speed of another obstacle. The collision risk calculator is further configured to determine a collision risk value associated with the evasive route along the current course direction based on the movable body information and the obstacle information. The collision risk evaluator is further configured to determine whether the movable body requires to at least one of: evade the evasive route and continue traversing on the evasive route based on the collision risk value associated with the evasive route. The evasive route generator is further configured to set a further evasive route in place of the evasive route ahead of at least one of: a current position and a predicted position of the movable body such that the collision risk value associated with the further evasive route is less than or equal to the predetermined threshold value.

Additionally, or optionally, the processing circuitry is further configured to periodically receive the movable body information in a first time period, periodically acquire the obstacle information in a second time period, and periodically generate a latest potential evasive route pattern based on at least one of: the current position and a predicted position of the movable body. At least one of: the current position and the predicted position of the movable body is considered as a new evasive starting point of the potential evasive route pattern.

Additionally, or optionally, the processing circuitry is further configured to periodically generate the latest evasive route in a third time period longer than at least any one of the first time period and the second time period based on the updated acquired movable body information and the updated acquired obstacle information.

Additionally, or optionally, the obstacle information includes information detected by at least one of: a radio detection and ranging (RADAR) device, a light detection and ranging (LIDAR) device, a sound navigation and ranging (SONAR) device, and an image sensor, such as a camera or a video recorder, installed on the movable body, information acquired by automatic identification system (AIS) receiver, information transmitted from another ship, and information acquired by detection of a radio communication at a place other than the movable body.

In one embodiment, the obstacle information further includes information relating to other movable bodies that include at least one of: other vessels, tidal currents, weather, reefs, and stranded ships.

Additionally, or optionally, the processing circuitry is further configured to display the evasive route along with the planned route on a screen of a display module.

In another aspect of the present disclosure, there is provided navigation route planning method. The navigation route planning method includes, receiving a planned route which indicates a route of a movable body and a current course direction from a current position of the movable body, receiving movable body information that includes at least any one of: a position, a travelling direction, and a speed of the movable body, receiving obstacle information that includes at least one of: a position, a traveling direction, and a speed of an obstacle, determining a collision risk value associated with the planned route along the current course direction based on the movable body information and the obstacle information, and determining whether the movable body requires to at least one of evade the planned route and continue traversing on the planned route based on the collision risk value associated with the planned route.

In yet another aspect of the present disclosure, there is provided a non-transitory computer readable medium having stored thereon computer-executable instructions which, when executed by a computer, cause the computer to receive a planned route which indicates a route of a movable body and a current course direction from a current position of the movable body, receive movable body information that includes at least one of: a position, a travelling direction, and a speed of the movable body, receive obstacle information that includes at least one of: a position, a traveling direction, and a speed of an obstacle, determine a collision risk value associated with the planned route along the current course direction based on the movable body information and the obstacle information, and determining whether the movable body requires to at least one of evade the planned route and continue traversing on the planned route based on the collision risk value associated with the planned route.

The problem of not being able to display visual information that can be intuitively used by the vessel navigating personnel to navigate the ship safely on the planned route is solved by using a navigation route planning apparatus that generates an evasive route ahead of at least one of: a current position and a predicted position of the movable body when an obstacle is determined in the planned route. Accordingly, the navigation route planning apparatus of the present disclosure allows the vessel navigating personnel, i.e., a user who operates the own ship to safely navigate the movable body on the evasive route displayed on a screen of a display module by avoiding collisions with surrounding obstacles such as, but not limited to, target ships, terrains.

BRIEF DESCRIPTION OF DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein.

FIGS. 2A and 2B illustrate a region surrounding the movable body;

FIG. 14 illustrates a table that represents multiple potential evasive routes and the corresponding collision risk values, the route lengths, and the traveling distances of the respective potential evasive routes;

DETAILED DESCRIPTION OF THE EMBODIMENTS

Figure 1:
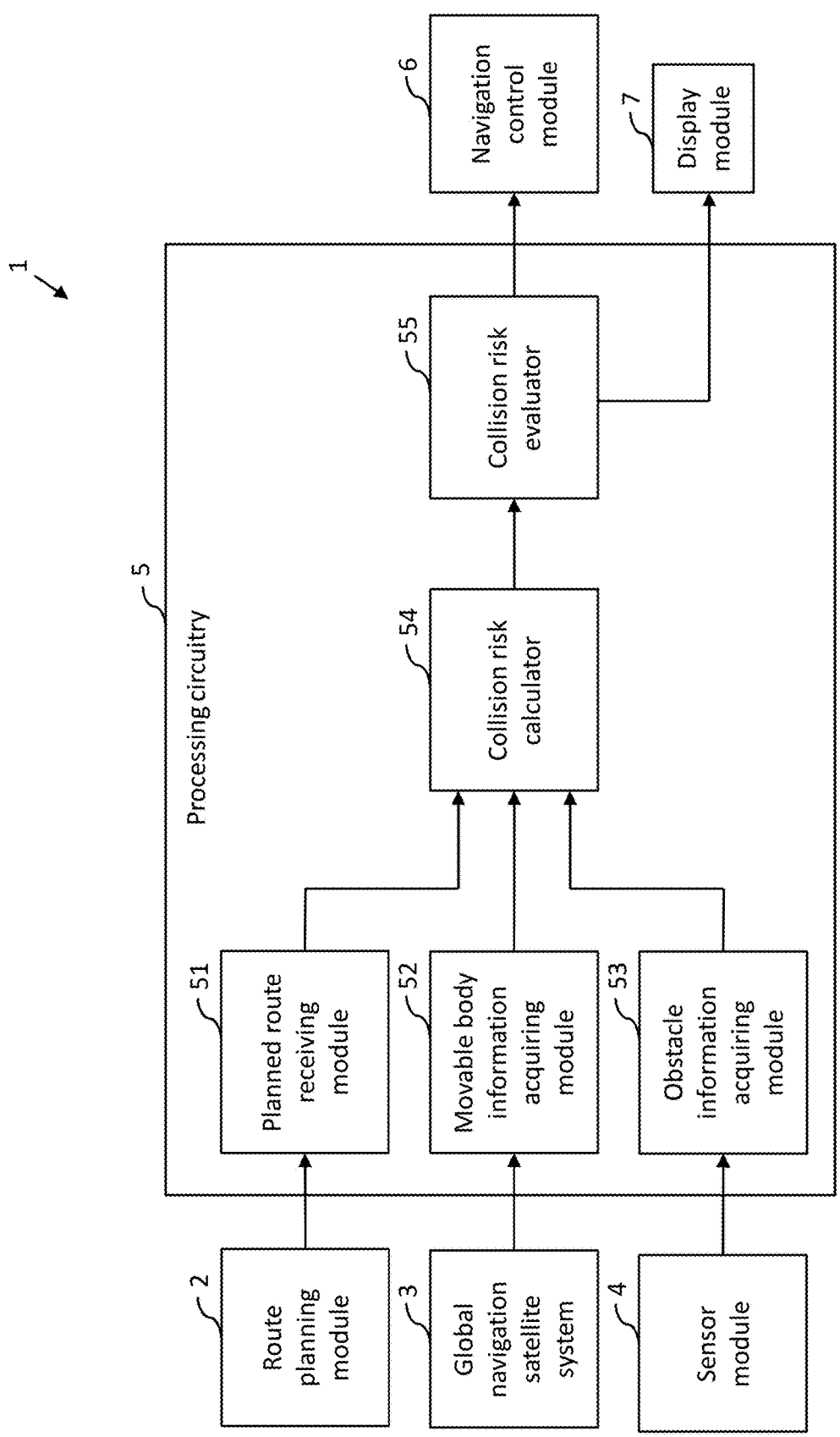
FIG. 1 is a block diagram illustrating a configuration of a navigation route planning apparatus for safely navigating a movable body (or own ship) according to one embodiment of the present disclosure.

Example apparatus are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

FIG. 1 is a block diagram illustrating a configuration of a navigation route planning apparatus 1 for safely navigating a movable body 200 (hereinafter also referred to as an "own ship 200"), according to one embodiment of the present disclosure. FIGS. 2A and 2B illustrate a region surrounding the own ship 200, according to one embodiment of the present disclosure.

The navigation apparatus 1 may be installed on the own ship 200 for navigation of the own ship 200 from a source location to a destination location. Once the voyage has begun, the navigation of the own ship 200 along a planned route 202 that is a path to be followed by the own ship 200 between the source location and the destination location must be monitored. The navigation apparatus 1 is configured to be used for safely navigating the own ship 200 by avoiding collisions with surrounding obstacles such as, but not limited to, target ships, terrains, and other target objects. A ship operator, i.e., a user who operates the own ship 200, navigates the own ship 200 along the planned route 202 with assistance of the navigation apparatus 1. In one embodiment, as illustrated in FIGS. 2A and 2B, the planned route 202 is a path to be followed by the own ship 200 to navigate and safely reach the destination location, and the planned route 202 indicates a route of the own ship 200 and a current course direction from a current position of the own ship 200.

The navigation apparatus 1 includes a route planning module 2, a global navigation satellite system (GNSS) 3, one or more sensor modules 4, processing circuitry 5, a navigation control module 6, and a display module 7.

The route planning module 2 is configured to store a plurality of routes for navigation of the own ship 200. In one embodiment, the ship operator may operate various peripheral devices operably coupled with the navigation apparatus 1 for performing various functions pursuant to functionalities in the present disclosure. For example, the user can provide various kinds of instructions to the navigation system 1 about a source location and a destination location for navigation of the own ship 200 by operating the peripheral devices, such as a keyboard and/or the mouse. Based on the information obtained from the user, such as the source location and the destination location, the route planning module 2 may provide one or more routes for navigation of the own ship 200 from the source location to the destination location. In one embodiment, each route may be associated with route information that may include, at least one of: date and time of travel, weather conditions, tidal conditions, and the like. The route planning module 2 receives a user input from the user regarding selection of a route as the planned route 202 for navigation of the own ship 200 from the source location to the destination location. It will be apparent to person skilled in the art that although in the present embodiment, the user selects the route for travelling, in an alternate embodiment, an optimal route may be selected by the route planning module 2 based on current weather conditions, time of travel, tidal conditions, and the like.

The navigation apparatus 1 uses information associated with the movable body 200 and one or more obstacles in the region surrounding the own ship 200 for safely navigating the own ship 200 from the source location to the destination location along the planned route 202. The GNSS 3 acquires movable body information that includes at least one of: a position, a travelling direction, and a speed of the own ship 200. The GNSS 3 accurately acquires the movable body information of the own ship 200 from satellites. The one or more sensor modules 4 acquire obstacle information that includes at least one of: a position, a travelling direction, and a speed of an obstacle 204 that may interfere with the navigation of the own ship 200. The one or more sensor modules 4 may correspond to one or more conventional maritime electronics devices. The one or more sensor modules 4 include at least one of: a radio detection and ranging (RADAR) device, a light detection and ranging (LIDAR) device, a sound navigation and ranging (SONAR) device, an automatic identification system (AIS) receiver, an image sensor, such as a camera or a video recorder, installed on the own ship 200, and the like. In one embodiment, the obstacle information includes information detected by at least one of: the RADAR, the LIDAR device, the SONAR device, and the image sensor, information acquired by the AIS receiver, information transmitted from another ship, and information acquired by detection of a radio communication at a place other than the own ship 200.

In one embodiment, the obstacle information further includes information relating to other movable bodies that include at least one of: other vessels, tidal currents, weather, reefs, and stranded ships. It will be apparent to a person skilled in the art that the information relating to the other movable bodies is acquired in a similar manner as the information for the obstacle 204 is acquired.

With continued reference to FIG. 1, the processing circuitry 5 includes a planned route receiving module 51, a movable body information acquiring module 52, an obstacle information acquiring module 53, a collision risk calculator 54, and a collision risk evaluator 55.

Referring now to FIGS. 1, 2A, and 2B, the planned route receiving module 51 may be operably coupled with, and hence in communication with, the route planning module 2 for receiving the route selected by the ship operator as the planned route 202. The movable body information acquiring module 52 may be operably coupled with, and hence in communication with the GNSS 3 for receiving the movable body information associated with the own ship 200. The movable body information acquiring module 52 is further configured to store the acquired movable body information.

The obstacle information acquiring module 53 may be operably coupled with, and hence in communication with the one or more sensor modules 4 for receiving the obstacle information associated with the obstacle 204. The obstacle information acquiring module 53 is further configured to store the obstacle information. In one embodiment, the movable body information acquiring module 52 periodically acquires the movable body information of the own ship 200, and the obstacle information acquiring module 53 periodically acquires the obstacle information of the obstacle 204.

The collision risk calculator 54 may be operably coupled with, and hence in communication with the planned route receiving module 51, the movable body information acquiring module 52, and the obstacle information acquiring module 53. The collision risk calculator 54 receives the route selected by the user as the planned route 202, the movable body information of the own ship 200, and the obstacle information of the obstacle 204.

The collision risk calculator 54 is further configured to determine a collision risk value associated with the planned route 202 along the current course direction based on the movable body information and the obstacle information. The collision risk value is calculated based on the position, the travelling direction, and the speed of the own ship 200 and the obstacle 204. The collision risk value indicates a degree of the risk of collision between the own ship 200 and the obstacle 204. In one example, if the obstacle 204 is sailing along a predicted future path 206 and the own ship 200 continues to sail along the planned route 202 such that the predicted future path 206 and the planned route 202 interfere at a point as illustrated in the FIGS. 2A and 2B, then the collision risk value is high and there will be a higher risk of collision between the own ship 200 and the obstacle 204.

The collision risk evaluator 55 may be operably coupled with, and hence in communication with the collision risk calculator 54, and configured to receive the collision risk value. The collision risk evaluator 55 is further configured to determine whether the own ship 200 requires to at least one of: evade the planned route 202 and continue traversing on the planned route 202 based on the collision risk value associated with the planned route 202. Relevant potential risks of collision may be determined by evaluating the collision risk value. If the collision risk is high then the own ship 200 is required to evade the planned route 202. In one example, if the collision risk evaluator 55 determines that the own ship 200 requires to evade the planned route 202 based on the collision risk value, then the navigation system 1 facilitates the ship operator to sail the own ship 200 through a different course 208 i.e., an evasive route 210 from a current position of the own ship 200 as a reference point 210 as illustrated in the FIGS. 2A and 2B.

Referring now to FIGS. 1, 2A, and 2B, the navigation control module 6 may be operably coupled with, and hence in communication with the collision risk evaluator 55. The navigation control module 6 is configured to monitor and control the navigation of the own ship 200, based on the determination whether the own ship 200 requires to at least one of: evade the planned route 202 and continue traversing on the planned route 202. To control the navigation of the own ship 200, the navigation control module 6 may control the position, the travel direction, and the speed of the own ship 200. Based on the determination that the own ship 200 is required to evade the planned route 202, the navigation control module 6 navigates the own ship 200 along a route, such as the evasive route 208, different than the current planned route 202. In one example, based on an actual direction of the own ship 200, the current course direction of the own ship 200 is along the planned route 202, as shown in FIG. 2A. In another example, based on an actual direction of the own ship 200, the current course direction of the own ship 200 is along the evasive route 208, as shown in FIG. 2B.

The display module 7 may be located on-board the own ship 200 and provided with, or in electrical connection to, the collision risk evaluator 55 on the own ship 200, as the ship instrument for purposes as will be explained in detail later herein. The display module 7 displays the planned route 202 along which the own ship 200 is traversing. In addition, when the own ship 200 is required to evade the planned route 202, the display module 7 displays the evasive route 208 along which the own ship 200 navigates to avoid the collision with the obstacle 204. Thus, the ship operator can safely navigate the own ship 200 by avoiding the collision with the obstacle 204.

The display module 7 may be configured as, for example, a display screen that forms part of a navigation assisting device to which a ship operator, i.e., a user, who operates the own ship 200 refers. However, the display module 7 is not limited to the above configuration, and, for example, it may be a display screen for a portable computer which is carried by a ship operator's assistant who monitors the surrounding situation from the own ship 200, a display screen for a passenger to watch in the cabin of the own ship 200, or a display part for a head mounted display, such as a wearable glass, worn by a passenger.

Figure 3:
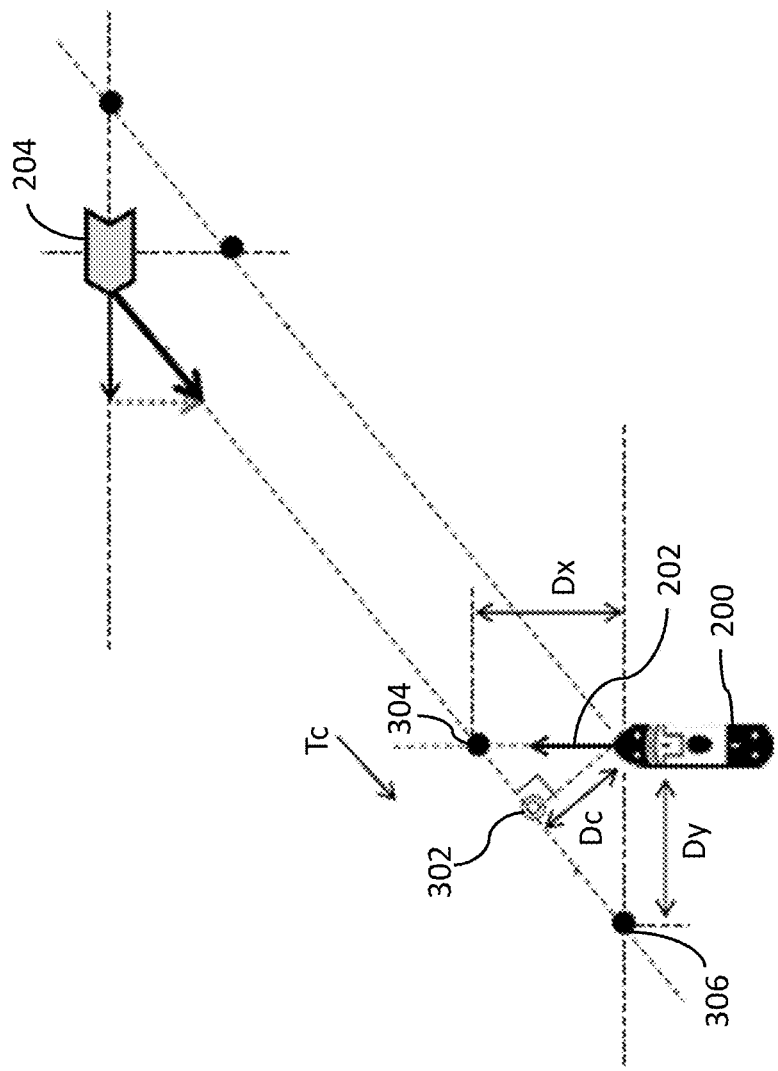
FIG. 3 illustrates determination of a collision risk value associated with a planned route, according to one embodiment of the present disclosure.

FIG. 3 illustrates determination of the collision risk value associated with the planned route 202, according to one embodiment of the present disclosure. The collision risk calculator 54 determines the collision risk value associated with the planned route 202 based on the movable body information and the obstacle information. The collision risk value associated with the planned route 202 may be determined based on the position, the travelling direction, and the speed of the own ship 200 and the obstacle 204.

The collision risk calculator 54 is further configured to determine at least one of: a closest distance Dc and a closest distance in a particular direction Dx or Dy between the own ship 200 and the obstacle 204 based on the movable body information and the obstacle information. In one embodiment, the closest distance Dc is a distance between a current location of the own ship 200 and a closest point of approach 302. The closest distance in a vertical direction Dx is a distance between the current location of the own ship 200 and the closest point of approach in the vertical direction 304. The closest distance in a lateral direction Dy is a distance between the current location of the own ship 200 and the closest point of approach in the lateral direction 306. The collision risk calculator 54 calculates the closest distances Dc, Dx, and Dy when the own ship 200 and the obstacle 204 approach each other, based on a positional relation between the own ship 200 and the obstacle 204, a relative velocity of the own ship 200 and the obstacle 204, a travelling direction and a speed of the own ship 200 and the obstacle 204.

The collision risk calculator 54 determines the collision risk value associated with the planned route 202 based on at least one of: the closest distance Dc and the closest distance in a particular direction Dx or Dy between the own ship 200 and the obstacle 204.

In one embodiment, when the closest distance Dc is less than or equal to a predetermined distance, the collision risk evaluator 55 determines that the collision risk is high and the own ship 200 is required avoid the obstacle 204 by travelling on the evasive route 208. On the other hand, when the closest distance Dc is greater than the predetermined distance, the collision risk evaluator 55 determines that the collision risk is low and the own ship 200 may continue on the planned route 202. In another embodiment, when the closest distance in a particular direction Dx or Dy is less than or equal to a predetermined distance, the collision risk evaluator 55 determines that the collision risk is high and the own ship 200 is required avoid the obstacle 204 by travelling on the evasive route 208. On the other hand, when the closest distances in the particular directions Dx and Dy are greater than the predetermined distance, the collision risk evaluator 55 determines that the collision risk is low and the own ship 200 may continue on the planned route 202. In this embodiment, the collision risk value may be calculated by identifying the positional relationship between the own ship 200 and the obstacle 204 based on at least any one of: the closest distance in the vertical direction Dx or the closest distance in the horizontal direction Dy. The risk of collision between the own ship 200 and the obstacle 204 increases when the obstacle 204 crosses ahead of the own ship 200.

In one embodiment, the collision risk calculator 54 is further configured to determine a time Tc required by the own ship 200 to traverse the closest distance Dc. The collision risk calculator 54 further determines the collision risk value associated with the planned route 202, i.e., when the own ship is navigating towards the destination from the starting point of the planned route 202, based on the closest distance Dc and the time Tc required by the own ship 200 to traverse the closest distance Dc. The time Tc required by the own ship 200 to traverse the closest distance Dc is calculated based on the movable body information and the obstacle information.

When the collision risk value is calculated on the basis of the closest distance Dc between the own ship 200 and the obstacle 204, the collision risk value increases even when the time until the own ship 200 approaches the obstacle 204 is very long. As a result, the own ship 200 may have to evade the planned route 202 to avoid collision with the obstacle 204 in after some time. Therefore, in one embodiment, the collision risk value associated with the planned route 202 is determined by taking into consideration the closest distance Dc between the own ship 200 and the obstacle 204, and the time Tc required by the own ship 200 to reach the closest point of approach 302.

In one example, the collision risk value associated with the planned route 202 is determined based on an equation (1) given below:

$$\text{Collision risk value} = \max(Dx, Dy) * Tc \quad (1)$$

Figure 4:
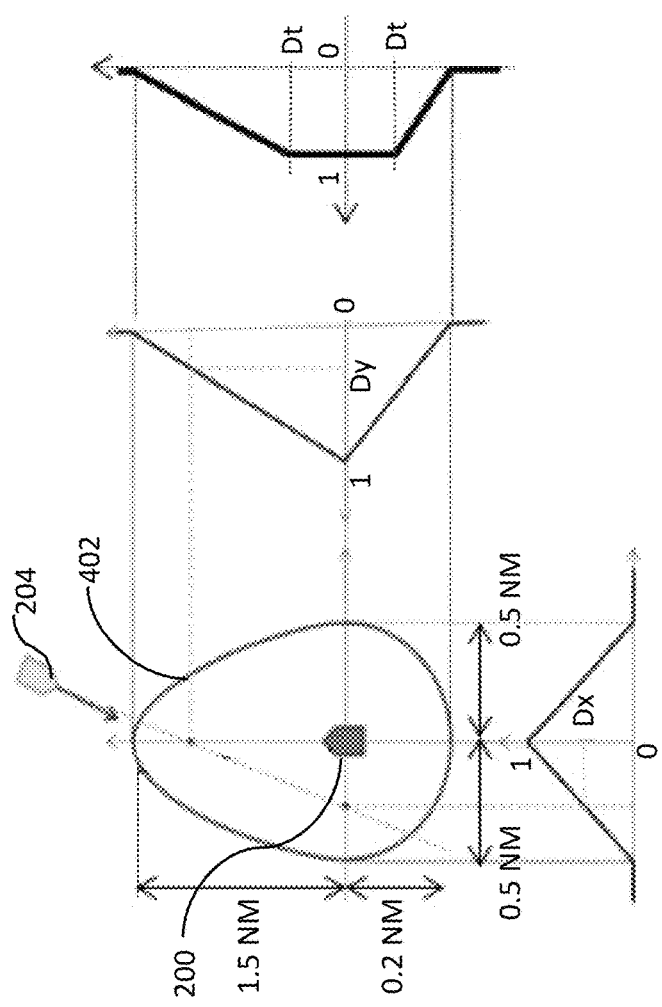
FIG. 4 illustrates determination of the collision risk value when the own ship approaches an obstacle, according to one embodiment of the present disclosure.

FIG. 4 illustrates determination of the collision risk value when the own ship 200 approaches the obstacle 204, according to one embodiment of the present disclosure. The collision risk value increases when the obstacle 204 enters an oval shaped area 402 around the own ship 200. In one example the oval shaped area 402 is determined based on a region within 1.5 nautical miles (NM) ahead, 0.2 NM miles behind, and 0.5 NM on sides of the own ship 200. The collision risk value increases if the distance between the own ship 200 and the obstacle 204 decreases. Thus, the collision risk value is inversely proportional to the distance between the own ship 200 and the obstacle 204. FIG. 4 further illustrates a relation between the collision risk value and a distance between the own ship 200 and the obstacle 204 in the vertical direction and a relation between the collision risk value and a distance the own ship 200 and the obstacle 204 in the lateral direction. In one example, the collision risk value for the closest distance in the vertical and lateral directions Dx and Dy are shown in FIG. 4. Based on the closest distance Dc between the own ship 200 and the obstacle 204, the threshold distance Dt is determined such that the collision risk value is high when the closest distance Dc between the own ship 200 and the obstacle 204 is less than or equal to the threshold distance Dt.

Figure 5:
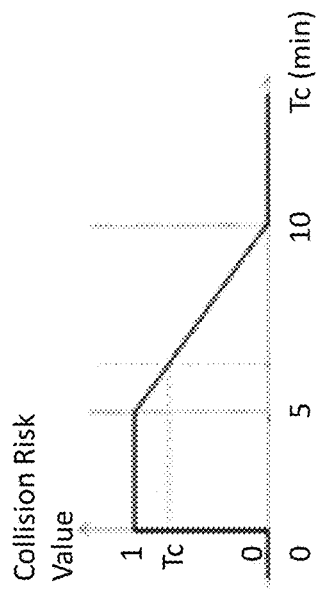
FIG. 5 illustrates a relationship between a time to a closest distance position and the collision risk value.

FIG. 5 illustrates a relationship between the time Tc required by the own ship 200 to traverse the closest distance Dc and the collision risk value. The collision risk value is high if the time Tc is less. In one example, the collision risk value is determined as high, i.e., maximum value of 1, when the time Tc is less than or equal to a predetermined time.

Figure 6:
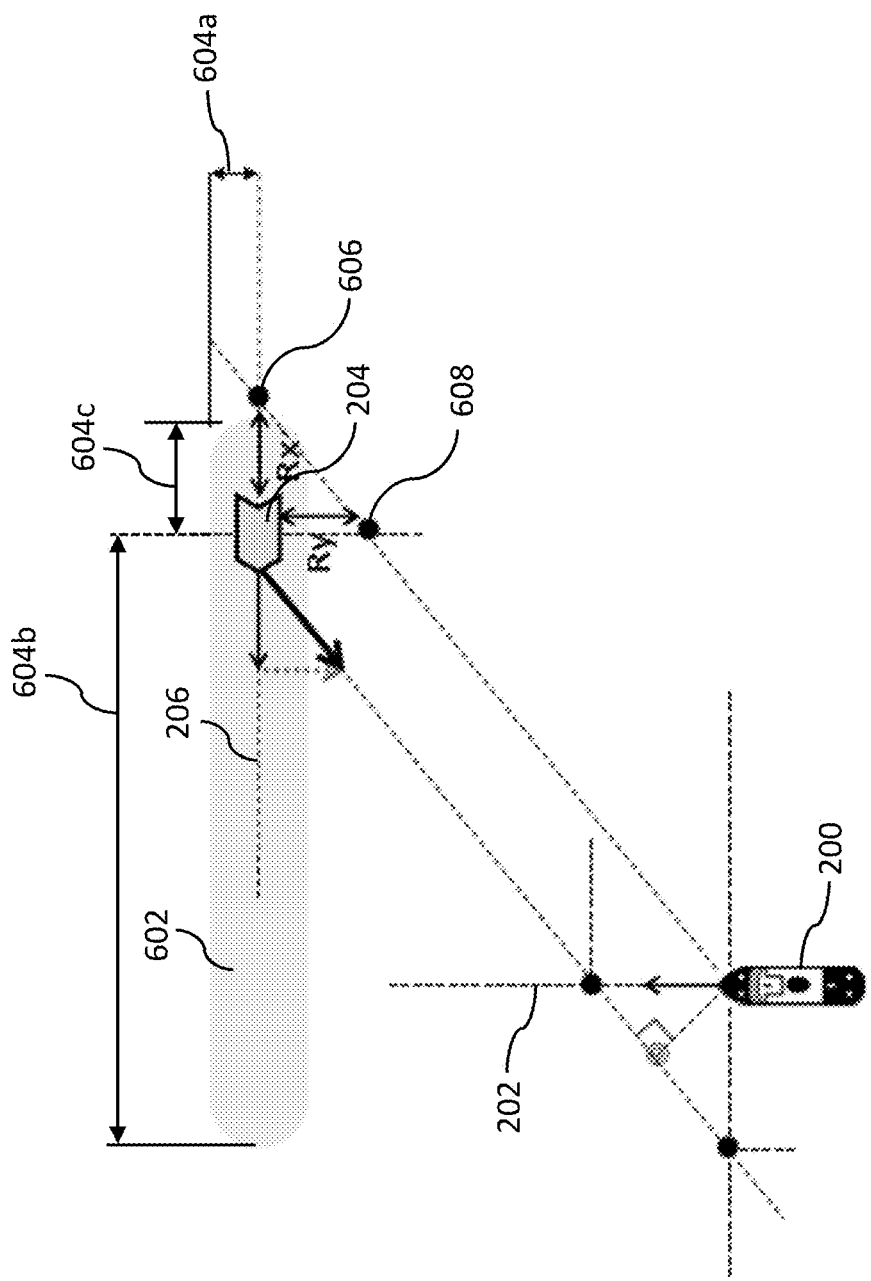
FIG. 6 illustrates determination of the collision risk value when the own ship approaches the obstacle, according to another embodiment of the present disclosure.

FIG. 6 illustrates determination of the collision risk value when the own ship 200 approaches the obstacle 204, according to another embodiment of the present disclosure. An obstacle bumper area 602 of the obstacle 204 is determined based on the position, the traveling direction, and the speed of the obstacle 204 i.e., a vessel. The obstacle bumper area 602 of the obstacle 204 is located on the predicted future path 206 of the obstacle 204 based on the travelling direction of the obstacle 204. The obstacle bumper area 602 of the obstacle 204 includes the obstacle 204 and a surrounding area of the obstacle 204. The obstacle bumper area 602 of the obstacle 204 may be determined based on safe passing distances 604a, 604b, and 604c which are allowable closest distances in side, front, and back of the own ship 200, respectively, to prevent collision. Further, the obstacle bumper area 602 corresponds to an access prohibition area, and allows simultaneous recognition of an impact orientation and the distance between the own ship 200 and the obstacle 204. A closest point (with respect to the obstacle 204) in the vertical or lateral direction 606 or 608 between the own ship 200 and the obstacle 204 is determined based on the movable body information and the obstacle information. When the closest point in the vertical or lateral direction 606 or 608 between the own ship 200 and the obstacle 204 is outside the obstacle bumper area 602 there is no risk of collision. As illustrated in the FIG. 6, in this embodiment, there is no risk of collision because neither the closest point in the vertical direction 606 at a distance of Rx nor the closest point in the lateral direction 608 at a distance Ry from the obstacle 204 is in the obstacle bumper area 602.

In one embodiment, the collision risk calculator 54 determines a time required for the own ship 200 to intrude into the obstacle bumper area 602 based on the relative speed between the own ship 200 and the obstacle 204. The collision risk calculator 54 further determines the collision risk value associated with the planned route 202 based on the time required for the own ship 200 to intrude into the obstacle bumper area 602.

Figure 7:
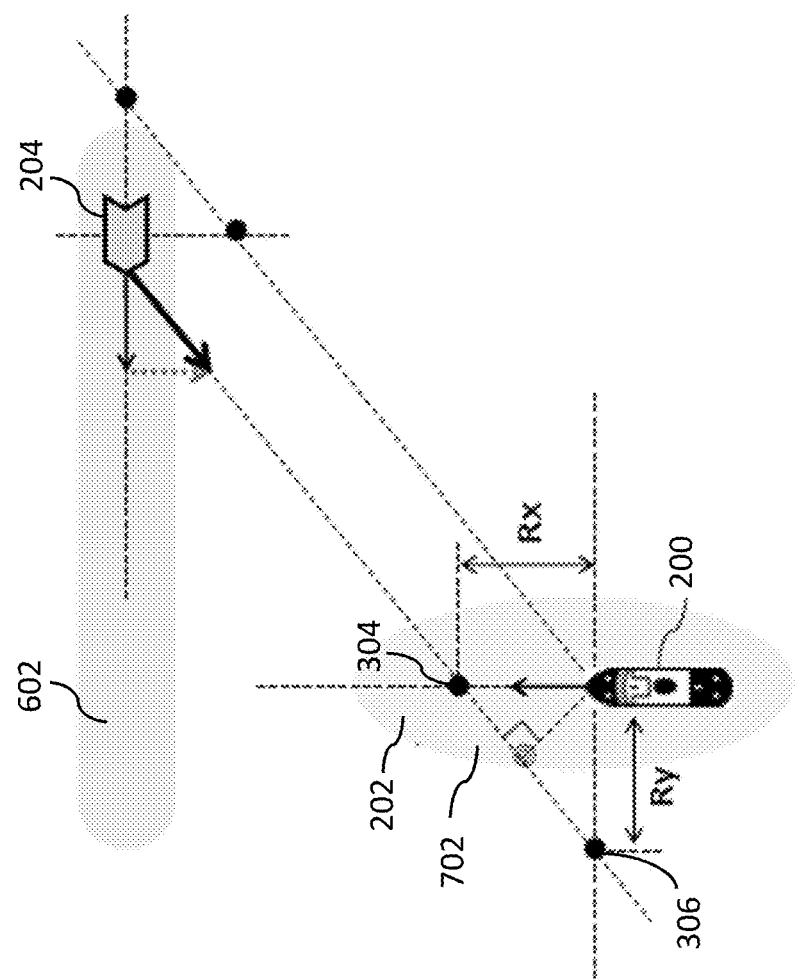
FIG. 7 illustrates determination of the collision risk value when the own ship approaches the obstacle, according to yet another embodiment of the present disclosure.

FIG. 7 illustrates determination of the collision risk value when the own ship 200 approaches the obstacle 204, according to yet another embodiment of the present disclosure. A movable body bumper area 702 of the own ship 200 is determined based on the position, the traveling direction, and the speed of the own ship 200. The movable body bumper area 702 of the own ship 200 is located on the planned route 202 of the own ship 200 based on the travelling direction of the own ship 200, and includes the own ship 200 and a surrounding area of the own ship 200. The closest point (with respect to the own ship 200) in the vertical or lateral direction 304 or 306 between the own ship 200 and the obstacle 204 is calculated based on the movable body information and the obstacle information. When the closest points in the vertical and lateral directions 304 and 306 between the own ship 200 and the obstacle 204 are outside the movable body bumper area 702 there is no risk of collision. As illustrated in the FIG. 7, in this embodiment, there is a risk of collision because the closest point in the vertical direction 304 at the distance Rx from the own ship 200 is in the movable body bumper area 702.

If the own ship 200 continues to sail in the current direction along the planned route 202 and intrudes into the obstacle bumper area 602 of the obstacle 204 then there will be a risk of collision. In one embodiment, the collision risk calculator 54 determines a time required for the movable body bumper area 702 to intrude into the obstacle bumper area 602 based on the relative speed between the own ship 200 and the obstacle 204. The collision risk calculator 54 further determines the collision risk value associated with the planned route 202 based on the time required for the movable body bumper area 702 to intrude into the obstacle bumper area 602.

Figure 8:
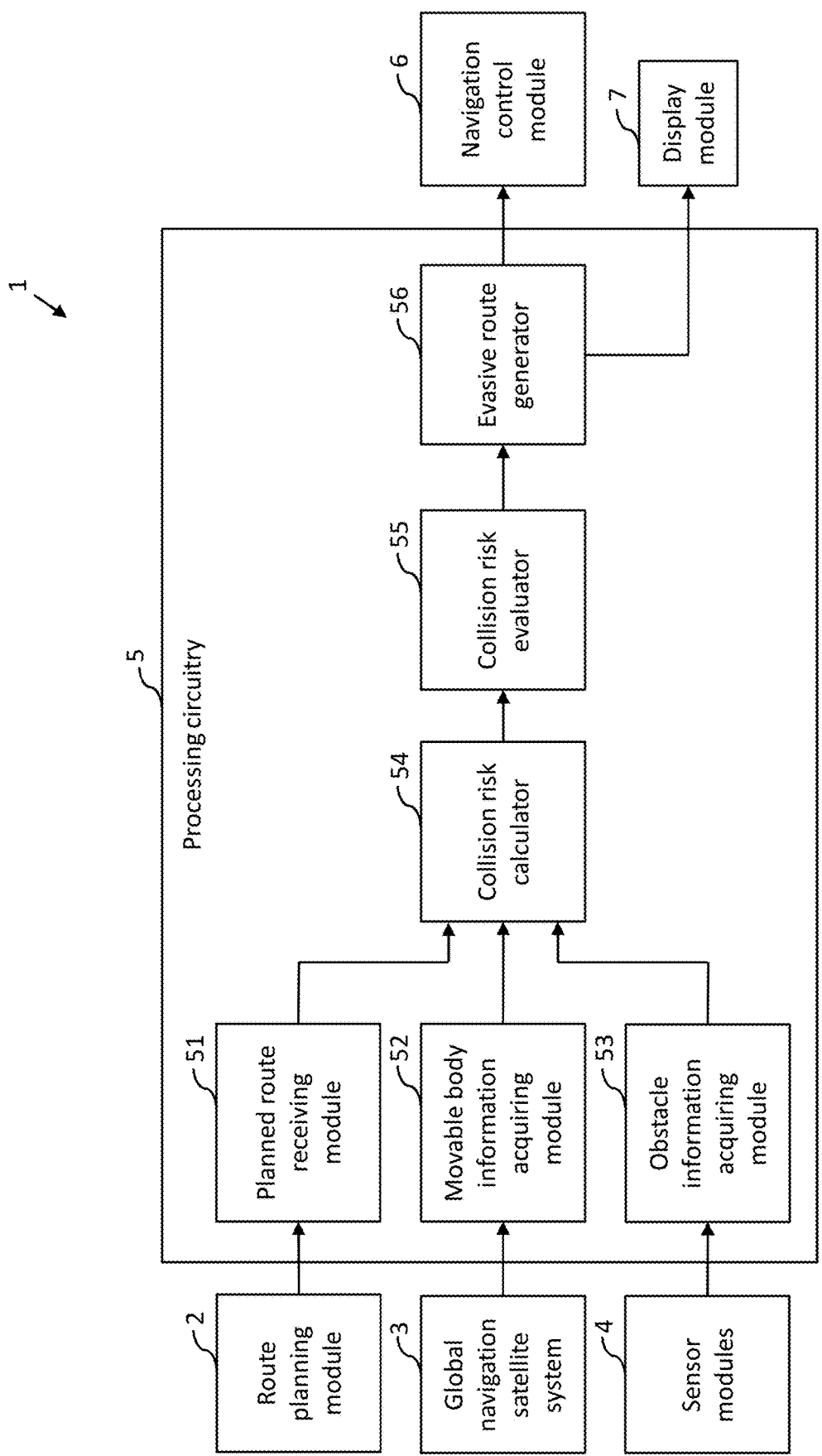
FIG. 8 is a block diagram illustrating the navigation route planning apparatus for safely navigating a movable body (or own ship) according to another embodiment of the present disclosure.

FIG. 8 is a block diagram illustrating the navigation route planning apparatus 1 for safely navigating the own ship 200, according to another embodiment of the present disclosure. The navigation apparatus 1 includes the route planning module 2, the GNSS 3, the one or more sensor modules 4, the processing circuitry 5, the navigation control module 6, and the display module 7. The route planning module 2, the GNSS 3, and the one or more sensor modules 4 function in a similar manner as described in FIG. 1.

The processing circuitry 5 includes the planned route receiving module 51, the movable body information acquiring module 52, the obstacle information acquiring module 53, the collision risk calculator 54, the collision risk evaluator 55, and an evasive route generator 56. The planned route receiving module 51, the movable body information acquiring module 52, the obstacle information acquiring module 53, the collision risk calculator 54, and the collision risk evaluator 55 function in a similar manner as described in FIG. 1.

Figure 9:
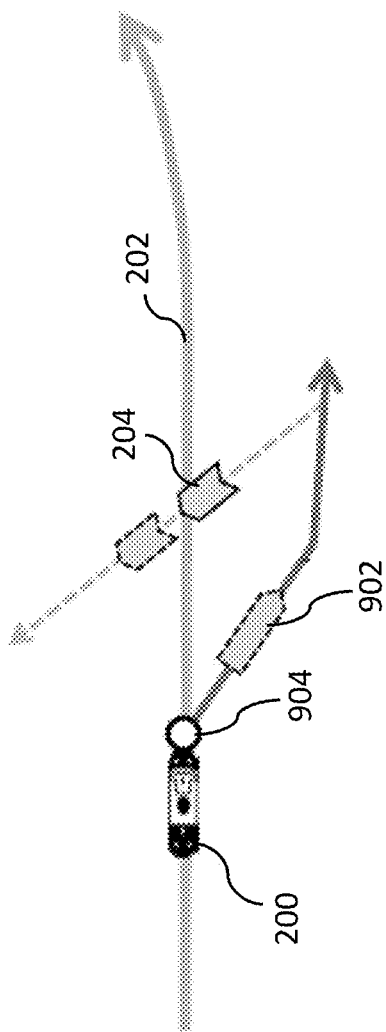
FIG. 9 illustrates an evasive route set for the own ship to avoid the obstacle.

FIG. 9 illustrates an evasive route 902 set for the own ship 200 to avoid the obstacle 204. Referring now to FIGS. 8 and 9, The evasive route generator 56 may be operably coupled with, and hence in communication with the collision risk evaluator 55. The evasive route generator 56 is configured to set the evasive route 902 in place of the planned route 202 ahead of at least one of: the current position 210 and a predicted position as the reference point of the own ship 200. The predicted position of the own ship 200 may be one of: a predicted position on the current course, a predicted position on the planned route 202, or a predicted position on an evasive route. The evasive route generator 56 may determine the predicted position based on a current speed and a turning angular velocity of the own ship 200. In one embodiment, the evasive route generator 56 sets the evasive route 902 when the obstacle 204 is determined on the planned path 202 of the own ship 200 as illustrated in the FIG. 2 such that the collision risk value associated with the evasive route 902 is less than or equal to a predetermined threshold value. The evasive route generator 56 sets the evasive route 902 based on the estimated collision risk value associated with the planned route 202. If the estimated collision risk value is high then the evasive route generator 56 generates and sets the evasive route 902 for the own ship 200 for avoiding collisions with the obstacle 204 that is to be avoided.

The generated evasive route 902 starts from an evasive starting point 904. The evasive starting point 904 is at least one of: the current position and the predicted position of the own ship 200. The ship operator i.e., a user who operates the own ship 200 can navigate the own ship 200 along the generated evasive route 902 for avoiding the collision with the obstacle 204. When the own ship 200 is navigating on the evasive route 902, the collision risk calculator 54 may regenerate the evasive route 902 even if the collision risk value is less than the predetermined value. In one scenario, the surrounding situation changes due to movement of the obstacle 204 resulting into change in the collision risk value, and thus the already set evasive route 902 may become a long route. The purpose of regenerating the evasive route 902 is to return to the planned route 202 with a shorter route while avoiding collision with the obstacle 204. Further, in one embodiment, the set evasive route 902 is fed back to the collision risk calculator 54, and the collision risk calculator 54 determines a collision risk value associated with the evasive route 902. In addition, the collision risk evaluator 55 determines whether the collision risk value for the evasive route 902 is less than the predetermined value to determine whether the own ship 200 may continue to navigate on the evasive route 902.

The navigation control module 6 may be operably coupled with, and hence in communication with the evasive route generator 56. The navigation control module 6 is configured to monitor and control the navigation of the own ship 200. The navigation control module 6 navigates the own ship 200 along the generated evasive route 902 based on the movable body information and the obstacle information. The display module 7 is configured to display the generated evasive route 902 which avoids the collision with the obstacle 204. Thus, the ship operator can safely navigate the own ship 202 along the evasive route 902 by avoiding the collision with the obstacle 204 when the collision risk value is high.

It will be apparent to a person skilled in the art that although in the current embodiment, the display module 7 is external to the processing circuitry 5, the scope of the present disclosure is not limited to it. In an alternate embodiment, the display module 7 is internal to the processing circuitry 5, without deviating from the scope of the present disclosure.

Figure 10:
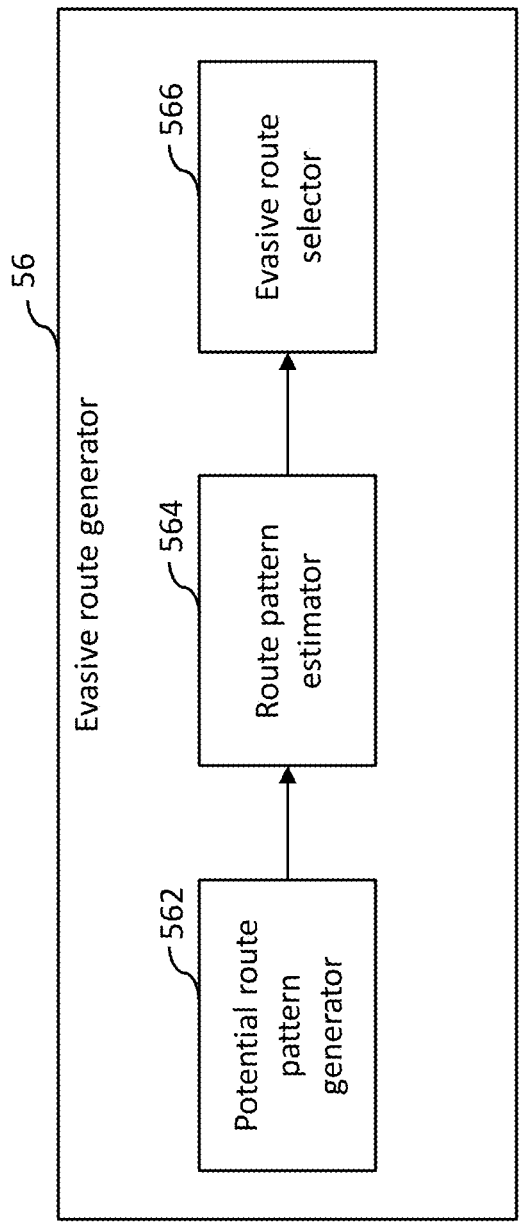
FIG. 10 is a block diagram illustrating the evasive route generator, according to one embodiment of the present disclosure.
Figure 11:
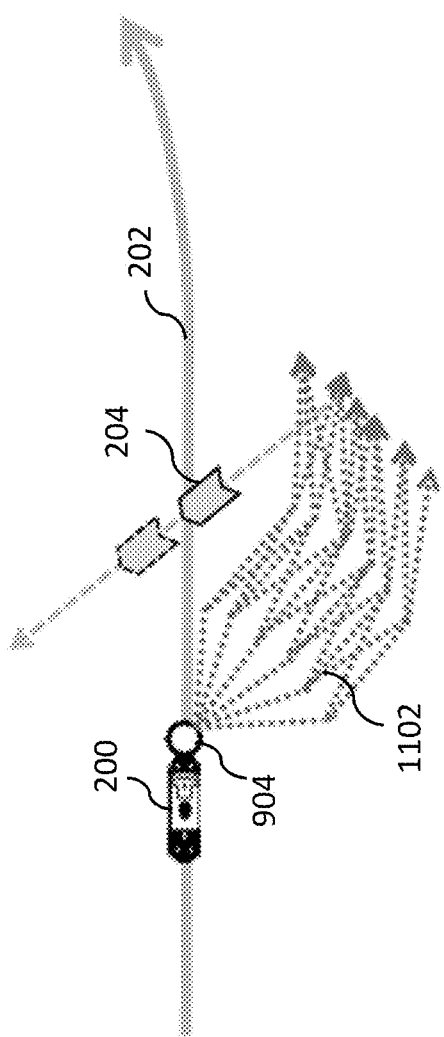
FIG. 11 illustrates a plurality of potential evasive route patterns generated for the own ship.

FIG. 10 is a block diagram illustrating the evasive route generator 56, according to one embodiment of the present disclosure. The evasive route generator 56 includes a potential evasive route pattern generator 562, a route pattern estimator 564, and an evasive route selector 566. The potential evasive route pattern generator 562 may be operably coupled with, and hence in communication with the collision risk evaluator 55. The potential evasive route pattern generator 562 generates a plurality of potential evasive route patterns 1102 in which the position of the own ship 200 is the evasive starting point 904, as shown in FIG. 11. the plurality of evasive route patterns 1102 are candidates of the evasive route 902 from the evasive starting point 904 to a traveling destination of the own ship 200. The potential evasive route pattern generator 562 generates the plurality of potential evasive route patterns 1102 when a risk of collision between the own ship 200 and the obstacle 204 is high. In one example, a first plurality of points are generated in a fan-like shape around the evasive starting point 208, and a second plurality of points is generated in a fan-like shape from each point of the first plurality of points. The plurality of potential evasive route patterns 1102 may be generated by sequentially connecting the first and second pluralities of points.

The route pattern estimator 564 may be operably coupled with, and hence in communication with the potential evasive route pattern generator 562, and determines a collision risk value for each potential evasive route pattern of the plurality of potential evasive route patterns 1102. In one example, a maximum value of the collision risk value may be determined from a starting point of each potential evasive route pattern to an end point of each potential evasive route pattern. In another example, the maximum value of the collision risk value may be determined from a starting point of each potential evasive route pattern to an arbitrary position in the middle of corresponding potential evasive route pattern.

The evasive route selector 566 may be operably coupled with, and hence in communication with the route pattern estimator 564, and configured to select the potential evasive route pattern from the plurality of potential evasive route patterns 1102 to be set as the evasive route 902 based on the determined collision risk value for each potential evasive route pattern of the plurality of potential evasive route patterns.

In one embodiment, the route pattern estimator 564 is further configured to determine a route length of each potential evasive route pattern. The route pattern estimator 564 determines the route length of each potential evasive route pattern based on the determined collision risk value for each potential evasive route pattern. The evasive route selector 566 is further configured to select the potential evasive route pattern from the plurality of potential evasive route patterns 1102 based on the determined collision risk value and the route length of each potential evasive route pattern of the plurality of potential evasive route patterns 1102. If the collision risk value is less, then the evasive route selector 566 selects an optimum potential evasive route pattern for the own ship 200. The lower the collision risk value, the longer the detour. Thus, the evasive route selector 566 selects the most appropriate potential evasive route pattern based on the collision risk value and the route length of each potential evasive route pattern.

Figure 12:
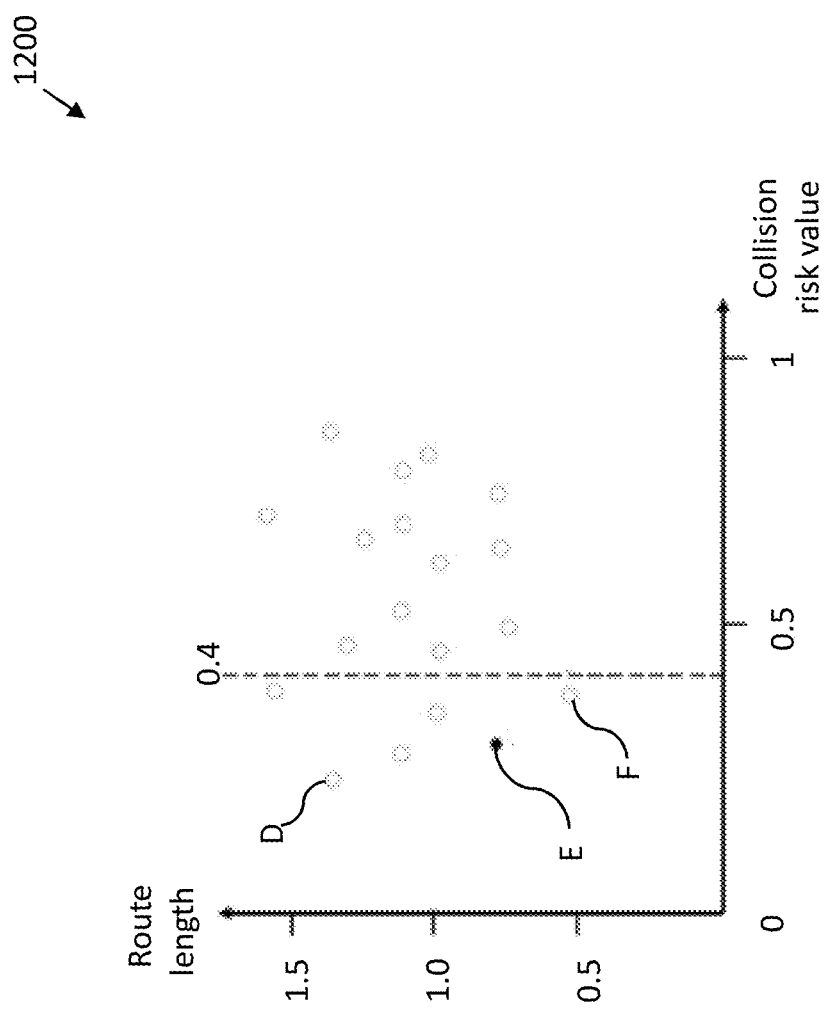
FIG. 12 illustrates a graph that represents a correlation between a collision risk value and a route length for each potential evasive route pattern.

FIG. 12 illustrates a graph 1200 that represents a correlation between the collision risk value and the route length for each potential evasive route pattern. The collision risk values are represented on X-axis and the route lengths (in NM) are represented on Y-axis. Assuming that the collision risk value of less than 0.4 is required for safe navigation and avoiding collision, there are at least 6 potential evasive route patterns generated by the potential evasive route pattern generator 562. In one example, the potential evasive route pattern "D" has the smallest collision risk value, but the route length of the respective potential evasive route pattern "D" is long. Further, the potential evasive route pattern "F" has a short route length compared with the potential evasive route pattern "D," but the collision risk value is close to 0.4. In addition, the potential evasive route pattern "E" having the smallest collision risk value compared with the potential evasive route pattern "F" and the route length of the respective potential evasive route pattern "E" is small compared with the potential evasive route pattern "D". Therefore, in this example, the evasive route selector 566 may select the potential evasive route pattern "E" as an optimal potential evasive route pattern.

In one scenario, if there is no potential evasive route pattern whose collision risk value is less than or equal to the predetermined value, then none of the plurality of potential evasive route patterns is selected. In this case, the navigation apparatus m 1 may provide at least any one of: a signal that indicates no evasive route pattern is found or/and an error message may be displayed that indicates no evasive route pattern is found.

Figure 13A:
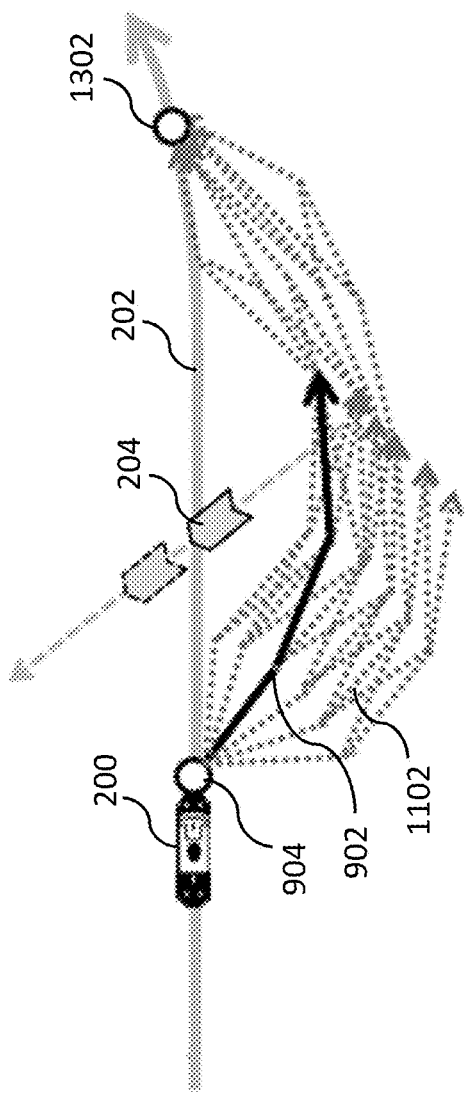
FIG. 13A illustrates a plurality of potential evasive route patterns between an evasive starting point and a return point.

FIG. 13A illustrates the plurality of potential evasive route patterns 1102 between the evasive starting point 904 and a return point 1302. The plurality of potential evasive route patterns 1102 may include evasive route patterns from the evasive starting point 904 to the return point 1302, evasive route patterns from the evasive route starting point 904 to the arbitrary position in middle of corresponding evasive route pattern, and evasive route patterns from the arbitrary position in middle of corresponding evasive route pattern to the return point 1302. The evasive route generator 56 is further configured to identify the return point 1302 at which the own ship 200 returns on the planned route 202 and generate the evasive route 902 that connects the evasive start point 904 and the return point 1302. The evasive route selector 566 may select at least one potential evasive route pattern from the plurality of potential evasive route patterns 1102, that are connected from the evasive start point 904 to the return point 1302, from the evasive route starting point 904 to the arbitrary position in middle of corresponding evasive route pattern, and from the arbitrary position in middle of corresponding evasive route pattern to the return point 1302. The ship operator can sail the own ship 200 along the selected potential evasive route pattern by avoiding the collision with the obstacle 204 and return the own ship 200 to the planned route 202 at the return point 1302. The return point 1302 is a position at which the own ship 200 returns to the planned route 202.

Referring now to FIG. 10, the route pattern estimator 564 is further configured to determine an evasive traveling distance of the potential evasive route pattern from the evasive starting point 902 to the return point 1302 at which the own ship 200 returns on the planned route 202. The evasive route selector 564 is further configured to select the potential evasive route pattern from the plurality of potential evasive route patterns 1102 based on the determined collision risk value, and the route length of each potential evasive route pattern of the plurality of potential evasive route patterns 1102, and the evasive traveling distance.

The evasive route generated by the evasive route generator 56 may be a route for avoiding the collision with the obstacle 204. In this case, a return route for returning the own ship 200 to the planned route 202 may be generated by the evasive route generator 56. When the evasive route 902 is generated, the evasive route generator 56 may further generate an evasive route to return the own ship 200 to the planned route 202.

FIG. 14 illustrates a table 1400 that represents multiple potential evasive routes and the corresponding collision risk values, the route lengths, and the traveling distances of the respective potential evasive routes. The evasive route selector 564 selects the evasive route pattern from the plurality of potential evasive route patterns 1102 based on the collision risk values, the route lengths, and the traveling distances of the respective potential evasive routes. In one example, the evasive route selector 564 may select the potential evasive route pattern "E" because the collision risk value, the pass length, and the traveling distance are optimal compared with the potential evasive route patterns A, B, D, and F as shown in the table 1400.

Figure 13B:
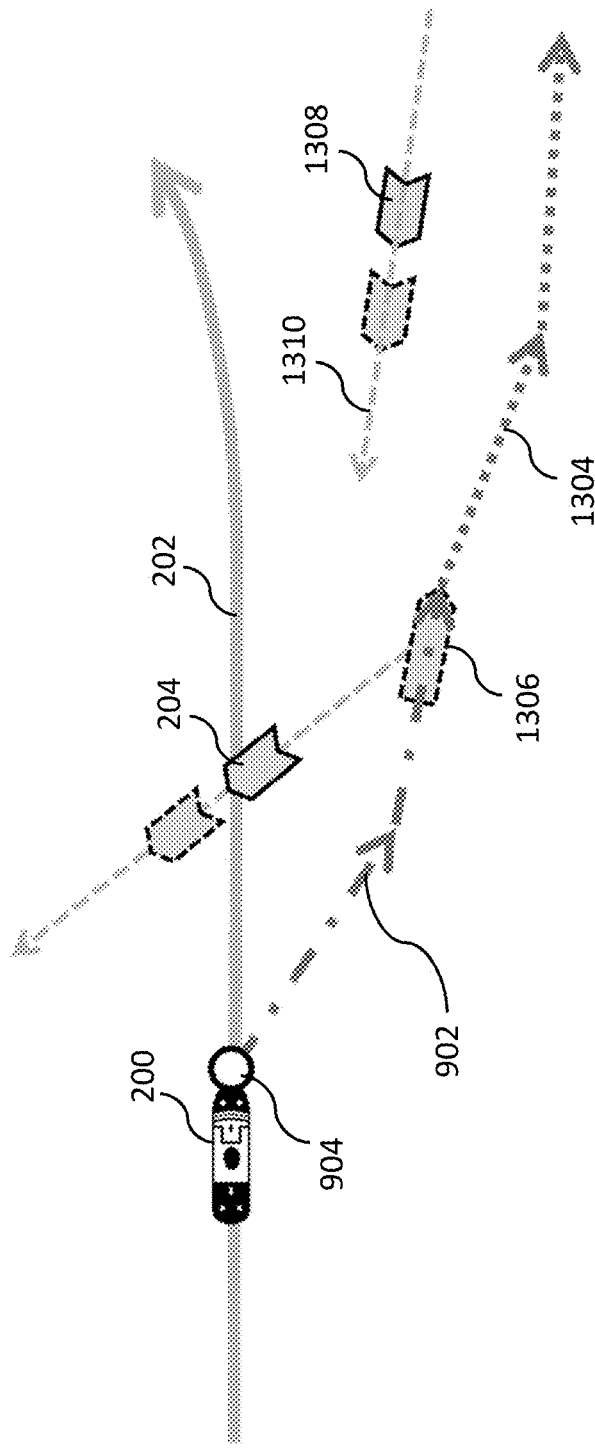
FIG. 13B illustrates a further evasive route from a predicted position for avoiding collision with another obstacle.

FIG. 13B illustrates a further evasive route 1304 from a predicted position 1306 for avoiding collision with another obstacle 1308. In one embodiment, the evasive route generator 56 sets one of the potential evasive route patterns (such as pattern E) as the evasive route 902 and the own ship 200 navigates on the evasive route 902 to avoid the obstacle 204. The movable body information acquiring module 52 receives the movable body information associated with the own ship 200, and the obstacle information acquiring module 53 receives the obstacle information associated with the other obstacle 1308. In one example, if the other obstacle 1308 is sailing along a predicted future path 1310 and the own ship 200 continues to sail along the evasive route 902 such that the predicted future path 1310 and the evasive route 902 interfere at a point as illustrated in the FIG. 13B, then the collision risk value is high and there will be a higher risk of collision between the own ship 200 and the other obstacle 1310.

The collision risk calculator 54 determines a collision risk value associated with the evasive route 902 along the current course direction based on the movable body information and the obstacle information associated with the other obstacle 1308 in a manner similar to determination of the collision risk value describe in conjunction to FIG. 1. The collision risk evaluator 55 determines whether the own ship 200 requires to at least one of: evade the evasive route 902 and continue traversing on the evasive route 902 based on the collision risk value associated with the evasive route 902. In one example, if the collision risk evaluator 55 determines that the own ship 200 requires to evade the evasive route 902 based on the collision risk value, then the navigation system 1 facilitates the ship operator to sail the own ship 200 through a different course, i.e., the further evasive route 1304 from the predicted position 1306 of the own ship 200 as a reference point as illustrated in the FIG. 13B. The evasive route generator 56 sets the further evasive route 1304 in place of the evasive route 902 ahead of at least one of: the current position 904 and the predicted position 1306 as the reference point of the own ship 200. In this embodiment, the predicted position 1306 of the own ship 200 is a predicted position on the evasive route 902.

The evasive route generator 56 sets the further evasive route 1304 based on the estimated collision risk value associated with the evasive route 902. If the estimated collision risk value is high then the evasive route generator 56 generates and sets the further evasive route 1304 for the own ship 200 for avoiding collisions with the other obstacle 1308 that is to be avoided. The display module 7 displays the planned route 202 and the evasive route 902 along which the own ship 200 is traversing. In addition, when the own ship 200 is required to evade the evasive route 902, the display module 7 displays the further evasive route 1304 along which the own ship 200 navigates to avoid the collision with the obstacle 1308. Thus, the ship operator can safely navigate the own ship 200 by avoiding the collisions with the obstacle 204 and the other obstacle 1308.

The evasive route generator 56 further generates a return route for the further evasive route 1304 such that the own ship 200 may return to the planned route 202 by navigating the return route. It will be understood by a person skilled in the art that the navigation apparatus 1 may repeat the process of determining the collision risk value and generation of the evasive route to avoid obstacles until the own ship 200 reaches the destination.

Figure 15:
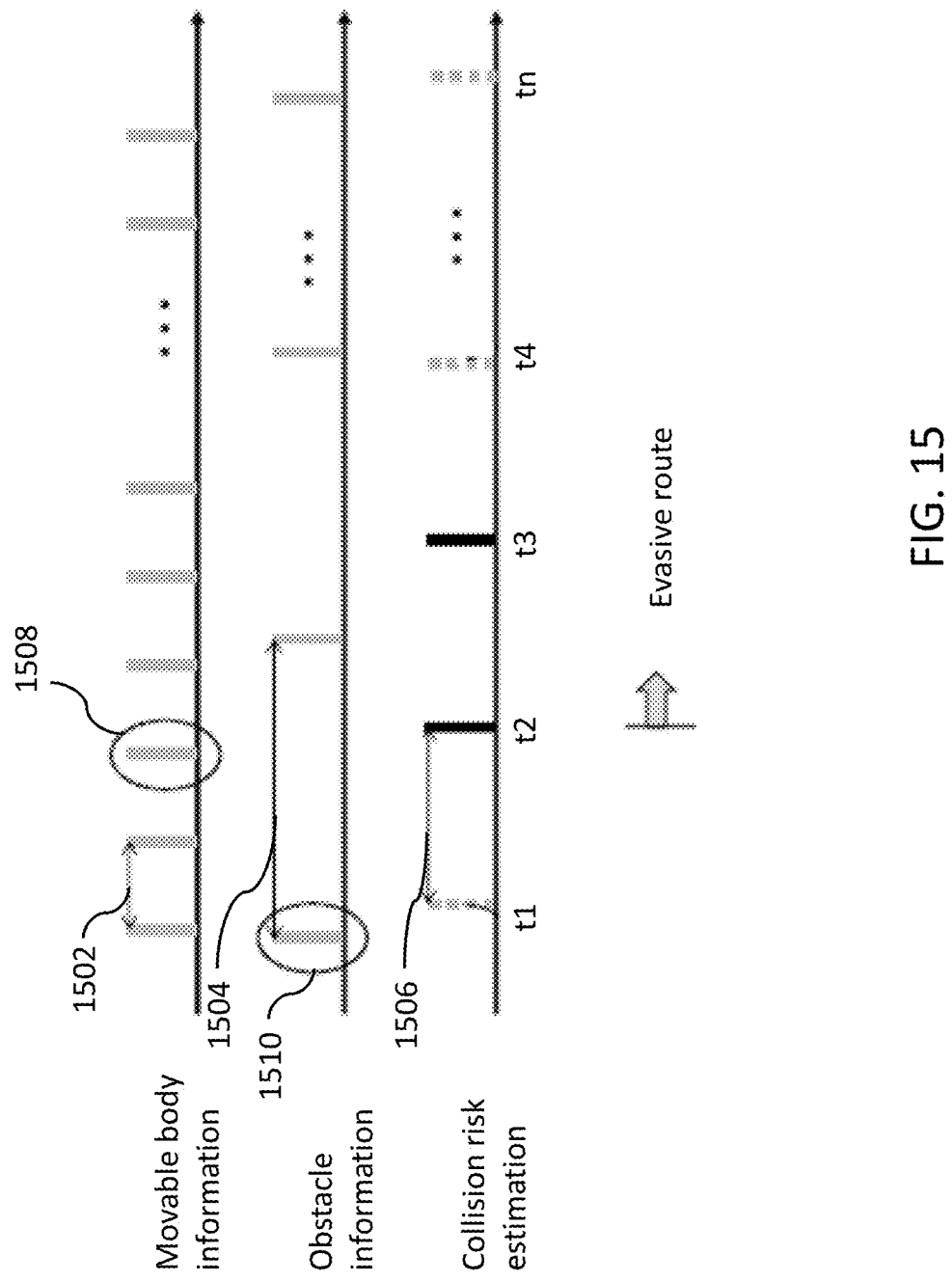
FIGS. 15-17 illustrate calculation of the collision risk value based on latest movable body information and latest obstacle information.
Figure 16:
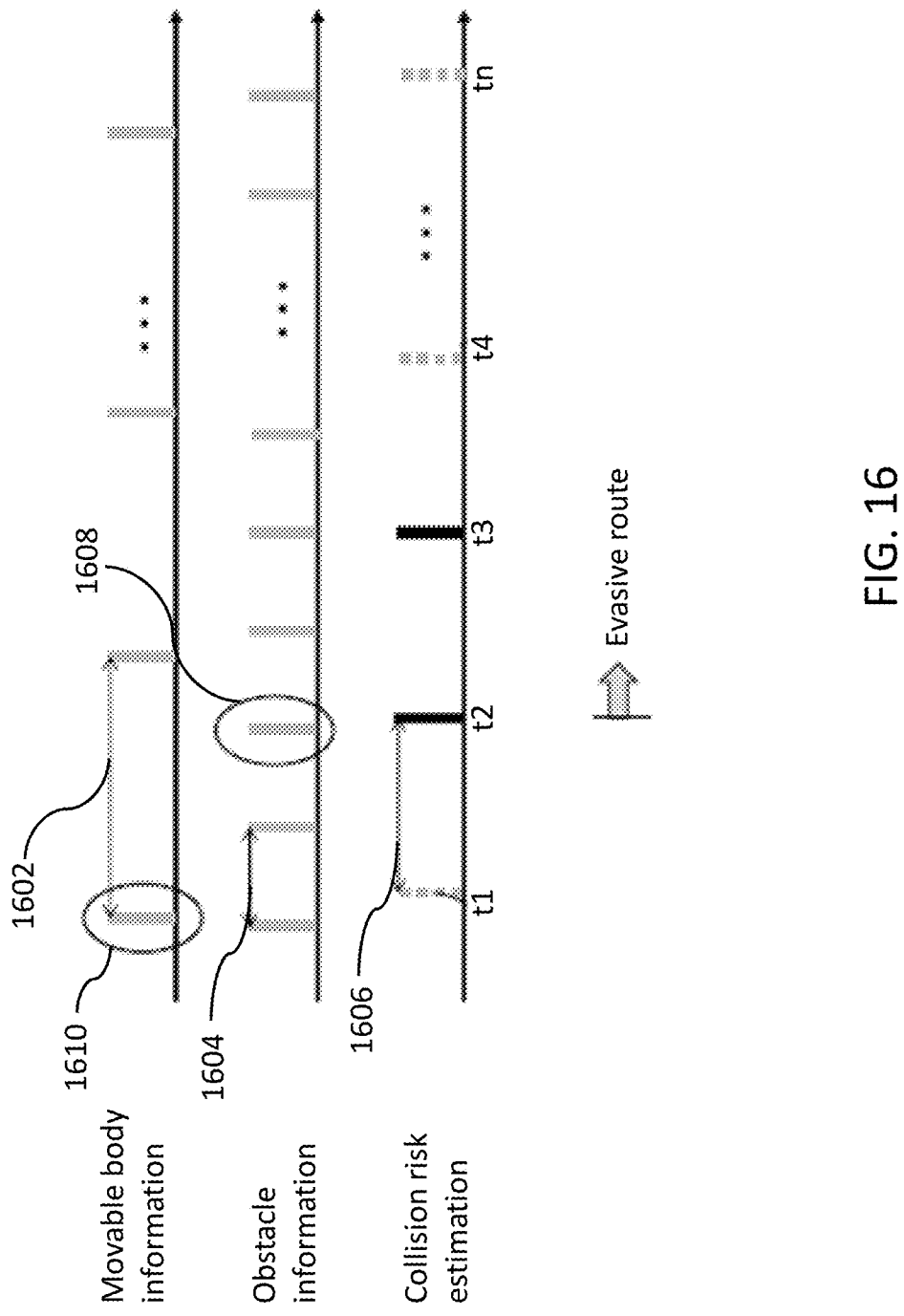
Figure 17:
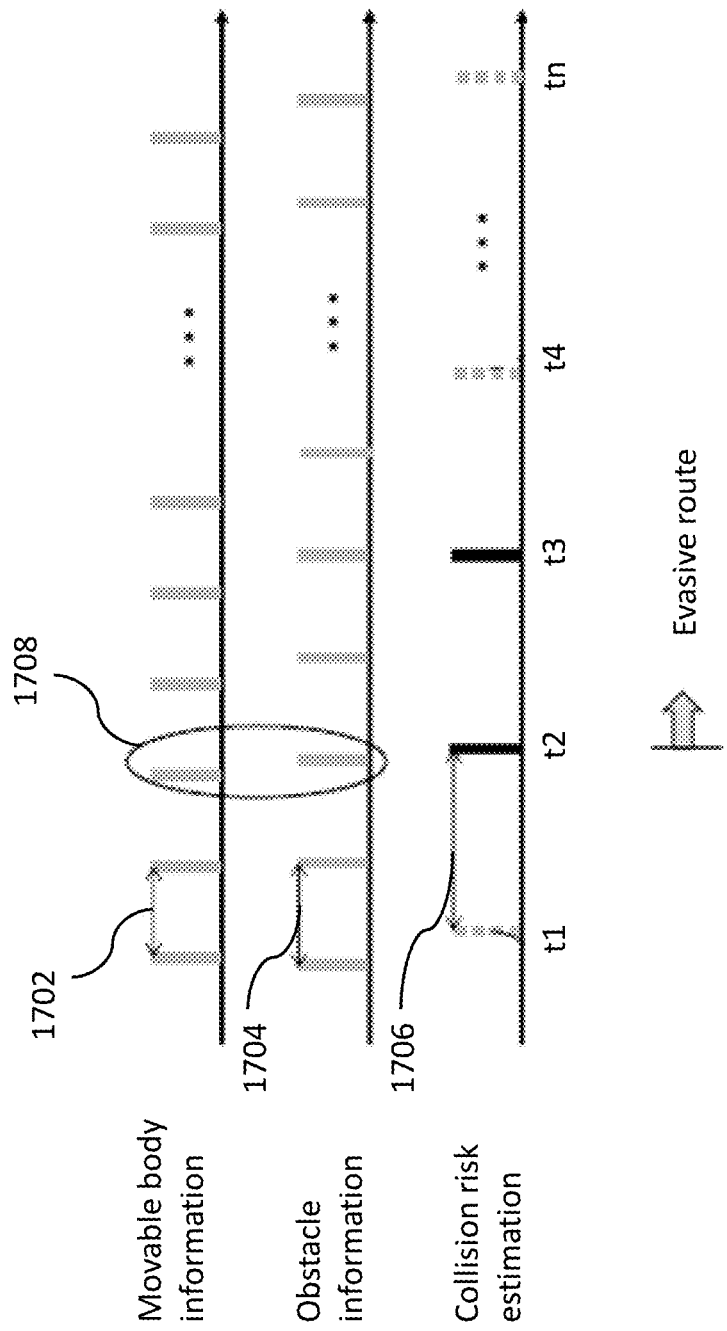

FIGS. 15-17 illustrate calculation of the collision risk value based on latest movable body information and latest obstacle information, according to one embodiment of the present disclosure. As the own ship 200 navigates, the surrounding area of the own ship 200 changes accordingly. Therefore, the movable body information acquiring module 52 is further configured to periodically receive the movable body information in a first time period 1502, i.e., at regular intervals of the first time period 1502. Similarly, the obstacle information acquiring module 53 is further configured to periodically acquire the obstacle information in a second time period 1504, i.e., at regular intervals of the second time period 1504. The evasive route generator 56 is further configured to periodically generate a latest evasive route based on a current position of the own ship 200. At least one of: the current position and the predicted position of the own ship 200 is considered as a new evasive starting point of the latest evasive route.

In one embodiment, the evasive route generator 56 is further configured to periodically generate the latest evasive route in a third time period 1506, i.e., at regular intervals of the third time period 1506, which is shorter than the second time period 1504 and longer than the first time period 1502 as shown in FIG. 15, based on the updated acquired movable body information and the updated acquired obstacle information.

The movable body information acquiring terminal module 52 acquires the movable body information in the first time period 1502, which is shorter than the third time period 1506. The collision risk degree at the timing t2 is calculated based on the movable body information and the obstacle information acquired at the timing t1 and t2 that are indicated by circles 1508 and 1510, respectively.

The periodic acquisition of the movable body information and the obstacle information are preferable because higher is a frequency of acquisition, a greater number of times the collision risk value may be determined based on the latest movable body information and the latest obstacle information.

Referring now to FIG. 16, in another embodiment, the collision risk value is periodically calculated in a third time period 1606. The evasive route generator 56 periodically generates the latest evasive route pattern in the third time period 1606 which is longer than the second time period 1604 and shorter than the first time period 1602 based on the updated acquired movable body information and the updated acquired obstacle information. The collision risk degree at the timing t2 is calculated based on the movable body information and the obstacle information acquired at the timing t1 and t2 that are indicated by circles 1610 and 1608, respectively.

Referring now to FIG. 17, in yet another embodiment, the evasive route generator 56 periodically generates the latest evasive route pattern in a third time period 1706 which is longer than the first time period 1702 and the second time period 1704 based on the updated acquired movable body information and the updated acquired obstacle information.

The collision risk degree at the timing t2 is calculated based on the movable body information and the obstacle information acquired at the timing t2 that are indicated by circles 1708. In FIG. 17, the obstacle information acquiring module 53 may acquire the obstacle information in the second time period 1704, which is shorter than the third time period 1706.

Ideally, it is preferable to acquire both the movable body information and the obstacle information at a high frequency and calculate the collision risk value based on the latest information. In one example, the collision risk value calculated at the timing t1 does not indicate a collision risk, but the value calculated at t2 indicates a high possibility of collision. Therefore, an evasive route is generated, and the own ship 200 is required to navigation along the evasive route. The calculated collision risk value at the timing t3 still indicates a collision risk with the obstacle, but the risk of collision decreases at t4 due to the evasive route.

Figure 18A:
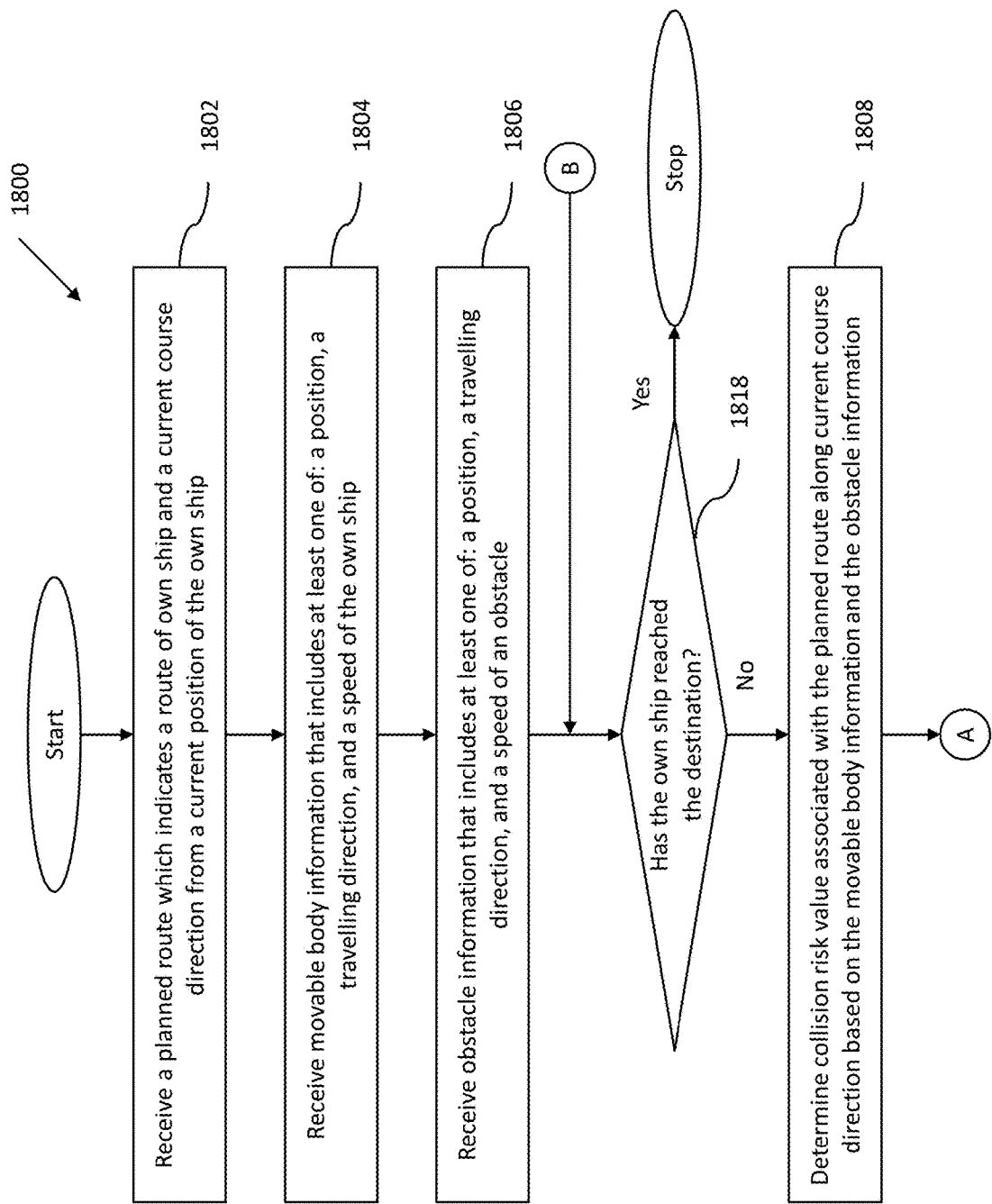
FIGS. 18A and 18B, collectively, represent a flow chart illustrating a navigation route planning method in accordance with an embodiment of the present disclosure.
Figure 18B:
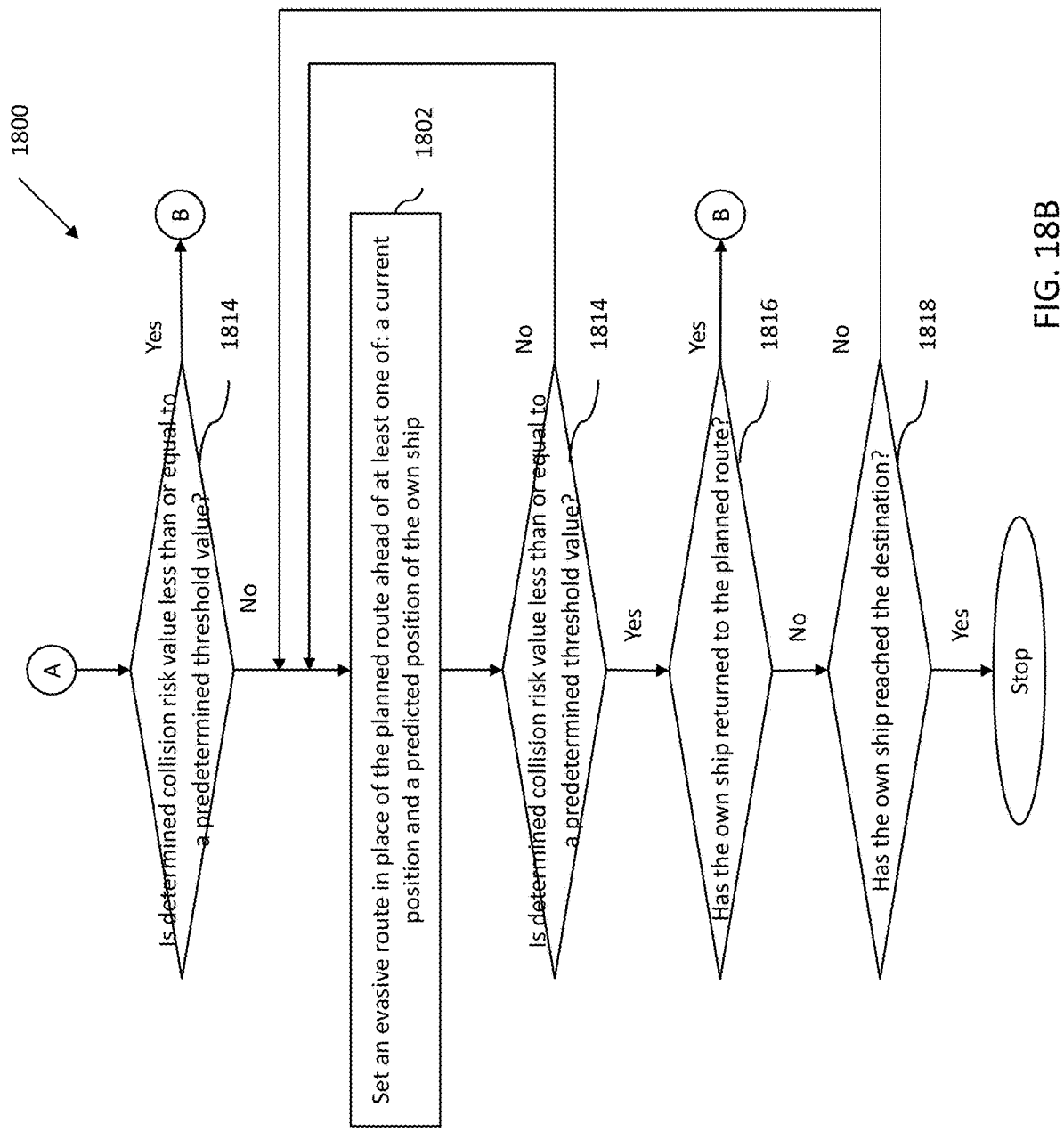

FIGS. 18A and 18B, collectively, represent a flow chart illustrating a navigation route planning method 1800 in accordance with an embodiment of the present disclosure.

At step 1802, the planned route receiving module 51 receives a planned route 202 which indicates a route of the own ship 200 and the current course direction from the current position of the own ship 200. The route planning module 2 may provide one or more routes for navigation of the own ship 200 from the source location to the destination location.

At step 1804, the movable body information acquiring module 52 receives the movable body information that includes at least one of: the position, the travelling direction, and the speed of the own ship 200.

At step 1806, the obstacle information acquiring module 53 receives the obstacle information from the sensor modules 4. The obstacle information includes at least one of: the position, the traveling direction, and the speed of the obstacle 204. The obstacle information further includes information relating to at least one of other movable bodies includes other vessels, tidal currents, weather, reefs, and stranded ships.

At step 1808, the collision risk calculator 54 determines the collision risk value associated with the planned route 202 along the current course direction based on the movable body information and the obstacle information.

If at step 1810, the collision risk evaluator 55 determines that the collision risk value associated with the planned route 202 is less than or equal to the predetermined threshold value, step 1808 is executed again. If at step 1810, the collision risk evaluator 55 determines that the collision risk value associated with the planned route 202 is greater than the predetermined threshold value, step 1812 is executed.

At step 1812, the evasive route generator 56 sets an evasive route 902 in place of the planned route 202 ahead of at least one of: the current position and a predicted position of the own ship 200 and the movable body 200 evades the planned route 202 to navigate on the evasive route 902.

If at step 1814, the collision risk evaluator 55 determines that the collision risk value associated with the evasive route 902 is less than or equal to the predetermined threshold value, step 1816 is executed. The movable body information and the obstacle information are fed back to the collision risk calculator 54 while the own ship 200 navigating along the evasive route 902 for determining the collision risk values associated with the evasive route 902. Thus, a shortest evasive route can be determined to return the own ship 200 to the planned route 202 while avoiding the collision with the obstacle 204.

If at step 1814, the collision risk evaluator 55 determines that the collision risk value associated with the evasive route 902 is greater than the predetermined threshold value, step 1812 is executed. Thus, the evasive route generator 56 generates and sets the further evasive route 1304 to avoid collisions.

If at step 1816, the collision risk evaluator 55 determines that the own ship 200 has not returned to the planned route 202, step 1814 is executed again. If at step 1816, the collision risk evaluator 55 determines that the own ship 200 has not returned to the planned route 202, step 1818 is executed. If at step 1818, the collision risk evaluator 55 determines that the own ship 200 has not reached the destination, step 1814 is executed again. If at step 1816, the collision risk evaluator 55 determines that the own ship 200 has reached the destination, navigation of the own ship 200 is completed.

Figure 19:
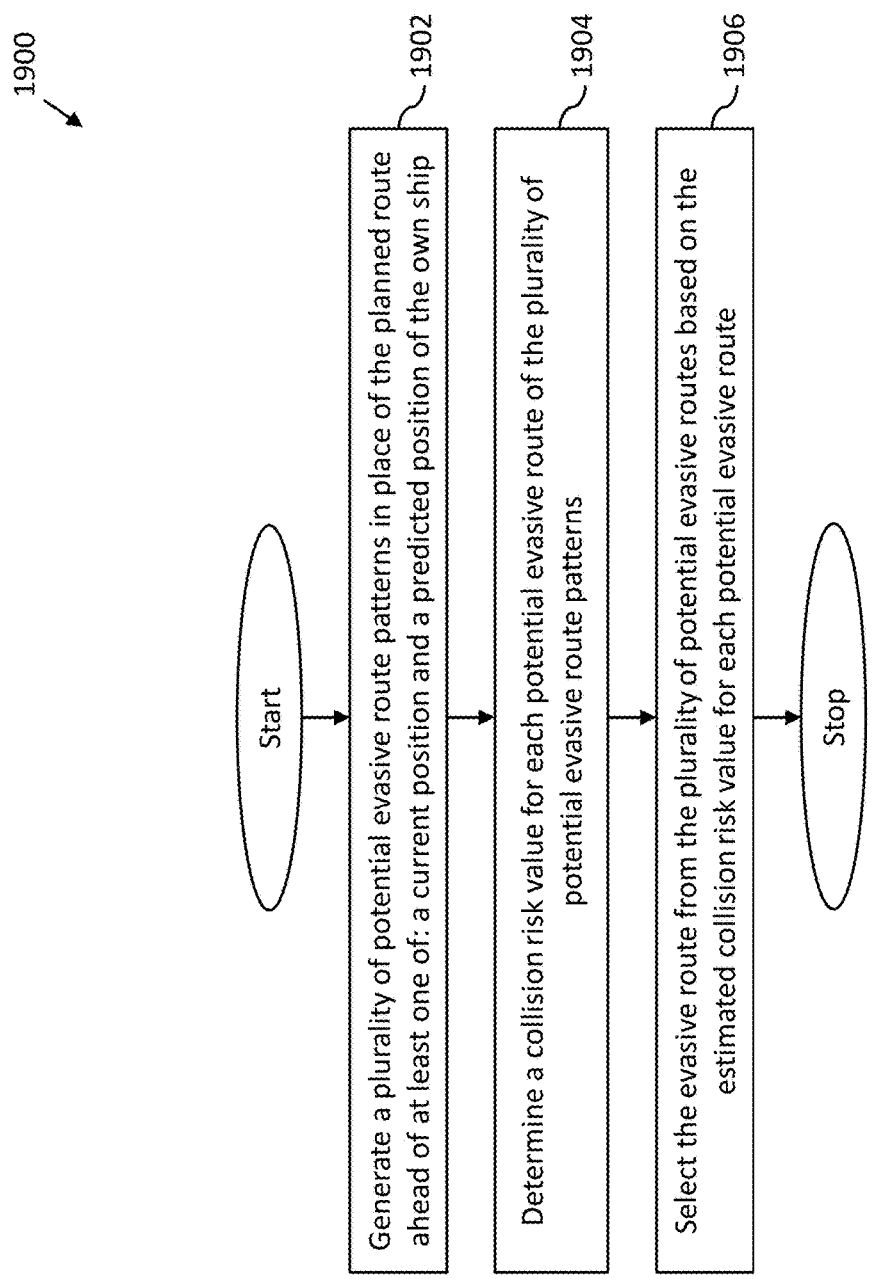
FIG. 19 represents a flow chart illustrating a method for setting the evasive route in accordance with an embodiment of the present disclosure.

FIG. 19 represents a flow chart illustrating a method 1900 for setting the evasive route in accordance with an embodiment of the present disclosure.

At step 1902, the potential route pattern generator 562 generates a plurality of potential evasive route patterns 1102 in place of the planned route 202 ahead of a current position of the own ship 200.

At step 1904, the route pattern estimator 564 determines the collision risk value for each potential evasive route pattern of the plurality of potential evasive route patterns 1102.

At step 1906, the evasive route selector 566 selects the potential evasive route pattern from the plurality of potential evasive route patterns 1102 to be set as the evasive route based on the determined collision risk value for each potential evasive route pattern of the plurality of potential evasive route patterns 1102.

Figure 20A:
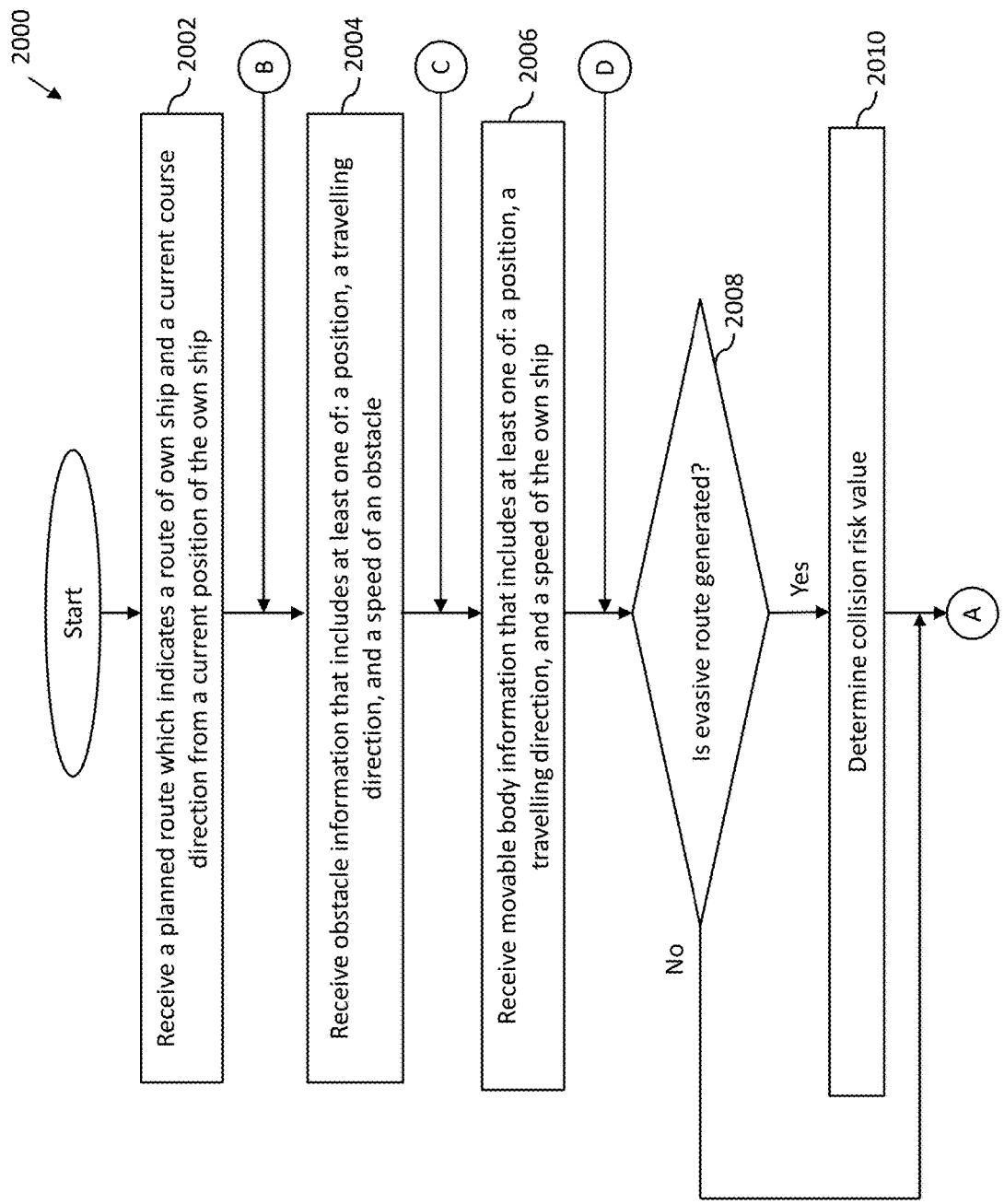
FIGS. 20A and 20B, collectively, represent a flow chart illustrating a navigation route planning method in accordance with another embodiment of the present disclosure.
Figure 20B:
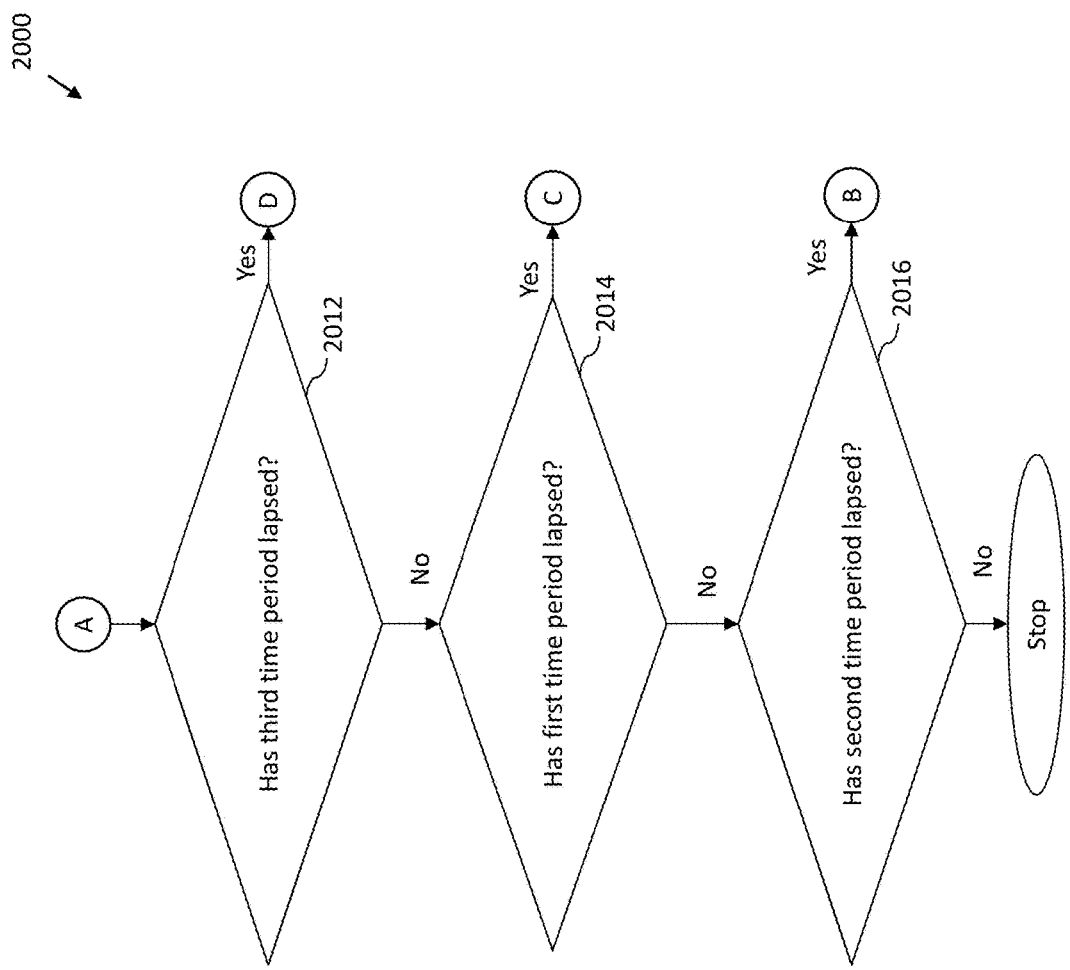

FIGS. 20A and 20B, collectively, represent a flow chart illustrating a navigation route planning method 2000 in accordance with another embodiment of the present disclosure.

At step 2002, the planned route receiving module 51 receives a planned route 202 which indicates a route of the own ship 200 and the current course direction from the current position of the own ship 200. The route planning module 2 may provide one or more routes for navigation of the own ship 200 from the source location to the destination location.

At step 2004, the obstacle information acquiring module 53 receives the obstacle information from the sensor modules 4. The obstacle information includes at least one of: the position, the traveling direction, and the speed of the obstacle 204. The obstacle information further includes information relating to at least one of other movable bodies includes other vessels, tidal currents, weather, reefs, and stranded ships.

At step 2006, the movable body information acquiring module 52 receives the movable body information that includes at least one of: the position, the travelling direction, and the speed of the own ship 200.

If, at step 2008, the evasive route generator 56 generates and sets an evasive route 902 in place of the planned route 202 ahead of at least one of: the current position and a predicted position of the own ship 200, step 2010 is executed. At step 2010, the collision risk calculator 54 determines the collision risk value associated with the evasive route 902. If, at step 2008, the evasive route generator 56 does not generate the evasive route 902 in place of the planned route 202 ahead of at least one of: the current position and the predicted position of the own ship 200, step 2012 is executed.

If at step 2012, it is determined that the third time period has lapsed, step 2008 is executed. If at step 2012, it is determined that the third time period has not lapsed, step 2014 is executed.

If at step 2014, it is determined that the first time period has lapsed, step 2006 is executed. If at step 2014, it is determined that the first time period has not lapsed, step 2016 is executed.

If at step 2016, it is determined that a first time period has lapsed, step 2004 is executed. The evasive route generator 56 is further configured to periodically generate the latest potential evasive route in the third time period based on the updated movable body information received periodically in the first time period and the updated obstacle information received periodically in the second time period.

When the evasive route 902 is set by the navigation route planning apparatus 1, the originally planned route 202 and the evasive route 902 are displayed on the screen of the display module 7. Further, the position of the own ship 200 and the position of obstacles, such as the obstacle 204, are also displayed on the screen of the display module 7. Additionally, the display may display the collision risk value. The operator may check the display and steer the vessel along the evasive route 902, or may switch to automatic navigation in conjunction with autopilot. Accordingly, the navigation route planning apparatus 1 of the present disclosure allows the vessel navigating personnel, i.e., a user who operates the own ship to safely navigate the movable body 200 on the planned route 202 or the evasive route 902 displayed on the screen of the display module 7 by avoiding collisions with surrounding obstacles such as, but not limited to, target ships, terrains.

It is to be understood that not necessarily all objectives or advantages may be achieved in accordance with any particular embodiment described herein. Thus, for example, those skilled in the art will appreciate that certain embodiments may be configured to operate in a manner that achieves or optimizes one advantage or group of advantages as taught herein without necessarily achieving other objects or advantages as may be taught or suggested herein.

All processes described herein may be embodied in, and fully automated via, software code modules executed by a computing system that includes one or more computers or processors. The software code modules may be stored in any type of non-transitory computer-readable medium or other computer storage device. Some or all methods may be embodied in specialized computer hard ware.

Many other variations other than those described herein will be apparent from this disclosure. For example, depending on the embodiment, certain actions, events, or functions of any of the algorithms described herein may be performed in different sequences, and may be added, merged, or excluded altogether (e.g., not all described actions or events are required to execute the algorithm). Moreover, in certain embodiments, operations or events are performed in parallel, for example, through multithreading, interrupt handling, or through multiple processors or processor cores, or on other parallel architectures, rather than sequentially. In addition, different tasks or processes can be performed by different machines and/or computing systems that can work together.

The various exemplary logical blocks and modules described in connection with the embodiments disclosed herein can be implemented or executed by a machine such as a processor. The processor may be a microprocessor, but alternatively, the processor may be a controller, a microcontroller, or a state machine, or a combination thereof. The processor can include an electrical circuit configured to process computer executable instructions. In another embodiment, the processor includes an application specific integrated circuit (ASIC), a field programmable gate array (FPGA), or other programmable device that performs logical operations without processing computer executable instructions. The processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, the processor may also include primarily analog components. For example, some or all of the signal processing algorithms described herein may be implemented by analog circuitry or mixed analog and digital circuitry. A computing environment may include any type of computer system, including, but not limited to, a computer system that is based on a microprocessor, mainframe computer, a digital signal processor, a portable computing device, a device controller, or a computing engine within the device.

Unless otherwise stated, conditional languages such as "can," "could," "will," "might," or "may" are understood within the context as used in general to convey that certain embodiments include, while other embodiments do not include, certain features, elements and/or steps. Thus, such conditional languages are not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive languages, such as the phrase "at least one of X, Y, or Z," unless specifically stated otherwise, is understood with the context as used in general to present that an item, term, etc., may be either X, Y, or Z, or any combination thereof (e.g., X, Y, and/or Z). Thus, such a disjunctive language is not generally intended to, and should not, imply that certain embodiments require at least one of X, at least one of Y, or at least one of Z to each be present.

Any process descriptions, elements, or blocks in the flow diagrams described herein and/or shown in the accompanying drawings should be understood as potentially representing modules, segments, or parts of code, including one or more executable instructions for implementing a particular logical function or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface". The term "vertical" refers to a direction perpendicular to the horizontal as just defined. Terms such as "above," "below," "bottom," "top," "side," "higher," "lower," "upper," "over," and "under" are defined with respect to the horizontal plane.

As used herein, the terms "attached," "connected," "coupled," and other such relational terms should be construed, unless otherwise noted, to include removable, moveable, fixed, adjustable, and/or releasable connections or attachments. The connections/attachments can include direct connections and/or connections having intermediate structure between the two components discussed.

Numbers preceded by a term such as "approximately," "about," and "substantially" as used herein include the recited numbers, and also represent an amount close to the stated amount that still performs a desired function or achieves a desired result. For example, the terms "approximately," "about," and "substantially" may refer to an amount that is within less than 10% of the stated amount. Features of embodiments disclosed herein preceded by a term such as "approximately," "about," and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

The invention claimed is:

1. A navigation route planning apparatus, comprising:
processing circuitry configured to:
receive a planned route which indicates a route of a movable body and a current course direction from a current position of the movable body;
receive movable body information that includes a position, a travelling direction, and a speed of the movable body;
receive obstacle information that includes a position, a traveling direction, and a speed of an obstacle;
determine a collision risk value associated with the planned route along the current course direction based on the movable body information and the obstacle information; and
based on the collision risk value associated with the planned route, provide an indication that controls a course of the moveable body, the indication indicating one of:
the movable body is to deviate from the planned route to avoid the obstacle when the collision risk value is above a predetermined threshold, or
it is not necessary for the movable body to deviate from the planned route to avoid the obstacle, and that the movable body may continue traversing on the planned route when the collision risk value is less than or equal to the predetermined threshold,
wherein the processing circuitry determines the collision risk value based on the each of:
a first closest distance between the movable body and the obstacle along the planned route, the first closest distance being a closest distance in any direction between the movable body and the obstacle along the planned route, and
a time required by the movable body to move along the planned route to the first closest distance.

2. A navigation control system, comprising:
the navigation route planning apparatus of claim 1, and
navigation control circuitry configured to:
receive the indication from the navigation route planning apparatus, and
control the movable body in accordance with the indication.

3. The navigation route planning apparatus of claim 1, wherein the processing circuitry is further configured to:
based on the movable body information and the obstacle information, determine a second closest distance between the movable body and the obstacle along the planned route the second closest distance being a closest distance in specific direction between the movable body and the obstacle along the planned route; and
determine a second collision risk value based on the second closest distance.

4. The navigation control system according to claim 2, further comprising:
a display configured to display at least one of the indication or an evasive route associated with the indication.

5. The navigation route planning apparatus of claim 3, wherein the processing circuitry is further configured to:
based on the movable body information and the obstacle information, determine a time required by the movable body to move to the second closest distance; and
determine the second collision risk value based on the second closest distance in a particular direction and the time required by the movable body to move to the second closest distance.

6. The navigation route planning apparatus of claim 1, wherein the processing circuitry is further configured to:
based on a relative speed between the movable body and the obstacle along the planned route determine a time required for the movable body to intrude into an obstacle bumper area that includes the obstacle and a surrounding area of the obstacle; and
determine a third collision risk value based on the time required for the movable body to intrude into the obstacle bumper area.

7. The navigation route planning apparatus of claim 6, wherein the processing circuitry is further configured to:
determine a time required for a movable body bumper area that includes the movable body and a surrounding area of the movable body to intrude into the obstacle bumper area; and
determine the third collision risk value based on the time required for a movable body bumper area to intrude into the obstacle bumper area.

8. The navigation route planning apparatus of claim 1, wherein the processing circuitry is further configured to:
when the indication indicates that the movable body is to deviate from the planned route to avoid the obstacle, set an evasive route in place of the planned route ahead of at least one of a current position or a predicted position of the movable body such that a collision risk value associated with the evasive route is less than or equal to the predetermined threshold value.

9. The navigation route planning apparatus of claim 8, wherein the processing circuitry is further configured to:
generate a plurality of potential evasive route patterns in which a position of the movable body is an evasive starting point;
determine a collision risk value for each potential evasive route pattern of the plurality of potential evasive route patterns; and
select a potential evasive route pattern from the plurality of potential evasive route patterns to be set as the evasive route based on the determined collision risk value for each potential evasive route pattern of the plurality of potential evasive route patterns.

10. The navigation route planning apparatus of claim 9, wherein the processing circuitry is further configured to:
determine a route length of each potential evasive route pattern; and
select the potential evasive route pattern from the plurality of potential evasive route patterns based on the determined collision risk value and the route length of each potential evasive route pattern of the plurality of potential evasive route patterns.

11. The navigation route planning apparatus of claim 10, wherein the processing circuitry is further configured to:
identify a return point at which the movable body returns on the planned route and generate the evasive route that connects the evasive starting point and the return point.

12. The navigation route planning apparatus of claim 11, wherein the processing circuitry is further configured to:
determine an evasive traveling distance from the evasive starting point to the return point on the planned route; and
select the potential evasive route pattern from the plurality of potential evasive route patterns based on the determined collision risk value and the route length of each potential evasive route pattern of the plurality of potential evasive route patterns, and the evasive traveling distance.

13. The navigation route planning apparatus of claim 8, wherein the processing circuitry is further configured to:
receive additional obstacle information that includes at least one of: a position, a traveling direction, or a speed of another obstacle;
determine a collision risk value associated with the evasive route based on the movable body information and the additional obstacle information;
based on the collision risk value associated with the evasive route, provide an indication that further controls the course of the moveable body, the indication indicating one of:
the movable body should deviate from the evasive route to avoid the another obstacle when the collision risk value associated with the evasive route is above the predetermined threshold, or
it is not necessary for the movable body to deviate from the evasive route to avoid the another obstacle, and that the movable body may continue traversing on the evasive route when the collision risk value associated with the evasive route is less than or equal to the predetermined threshold,
set a further evasive route in place of the evasive route ahead of at least one of a current position or a predicted position of the movable body such that the collision risk value associated with the further evasive route is less than or equal to the predetermined threshold value.

14. The navigation route planning apparatus of claim 13, wherein the processing circuitry is further configured to:
periodically receive the movable body information in a first time period;
periodically acquire the obstacle information in a second time period; and
periodically generate a latest potential evasive route pattern based on a current position of the movable body,
wherein at least one of the current position or the predicted position of the movable body is considered as a new evasive starting point of the potential evasive route pattern.

15. The navigation route planning apparatus of claim 14, wherein the processing circuitry is further configured to:
periodically generate the latest evasive route in a third time period longer than at least one of the first time period or the second time period based on the updated acquired movable body information and the updated acquired obstacle information.

16. The navigation route planning apparatus of claim 8, the processing circuitry is further configured to:
display the evasive route along with the planned route on a screen of a display module.

17. The navigation route planning apparatus of claim 1, wherein the obstacle information includes at least one of:
information detected by at least one of: a radio detection and ranging (RADAR) device, a light detection and ranging (LIDAR) device, a sound navigation and ranging (SONAR) device, or an image sensor, such as a camera or a video recorder, installed on the movable body,
information acquired by automatic identification system (AIS) receiver,
information transmitted from another ship, or
information acquired by detection of a radio communication at a place other than the movable body.

18. A navigation route planning method, comprising:
receiving, by a navigation route planning apparatus, a planned route which indicates a route of a movable body and a current course direction from a current position of the movable body;
receiving, by the navigation route planning apparatus, movable body information that includes at least one of: a position, a travelling direction, or a speed of the movable body;
receiving, by the navigation route planning apparatus obstacle information that includes at least one of: a position, a traveling direction, or a speed of an obstacle;
determining, by the navigation route planning apparatus, a collision risk value associated with the planned route along the current course direction based on the movable body information and the obstacle information; and
based on the collision risk value associated with the planned route, providing an indication that controls a course of the moveable body, the indication indicating one of:
the movable body is to deviate from the planned route to avoid the obstacle when the collision risk value is above a predetermined threshold, or it is not necessary for the movable body to deviate from the planned route to avoid the obstacle, and that the movable body may continue traversing on the planned route when the collision risk value is less than or equal to the predetermined threshold, wherein the processing circuitry determines the collision risk value based on the each of:
  a first closest distance between the movable body and the obstacle along the planned route, the first closest distance being a closest distance in any direction between the movable body and the obstacle along the planned route, and
  a time required by the movable body to move along the planned route to the first closest distance.

19. The navigation route planning method of claim 18, further comprising:
  generating, by the navigation route planning apparatus, a plurality of potential evasive route patterns in which a position of the movable body is an evasive starting point;
  determining, by the navigation route planning apparatus, a collision risk value for each potential evasive route pattern of the plurality of potential evasive route patterns; and
  selecting, by the navigation route planning apparatus, a potential evasive route pattern from the plurality of potential evasive route patterns to be set as the evasive route based on the determined collision risk value for each potential evasive route pattern of the plurality of potential evasive route patterns.

20. A non-transitory computer readable medium having stored thereon computer-executable instructions which, when executed by a computer, cause the computer to:
  receive a planned route which indicates a route of a movable body and a current course direction from a current position of the movable body;
  receive movable body information that includes at least one of: a position, a travelling direction, or a speed of the movable body;
  receive obstacle information that includes at least one of: a position, a traveling direction, or a speed of an obstacle;
  determine a collision risk value associated with the planned route along the current course direction based on the movable body information and the obstacle information; and
  based on the collision risk value associated with the planned route, provide an indication that controls a course of the moveable body, the indication indicating one of:
    the movable body is to deviate from the planned route to avoid the obstacle when the collision risk value is above a predetermined threshold, or
    it is not necessary for the movable body to deviate from the planned route to avoid the obstacle, and that the movable body may continue traversing on the planned route when the collision risk value is less than or equal to the predetermined threshold, wherein the processing circuitry determines the collision risk value based on the each of:
  a first closest distance between the movable body and the obstacle along the planned route, the first closest distance being a closest distance in any direction between the movable body and the obstacle along the planned route, and
  a time required by the movable body to move along the planned route to the first closest distance.

\* \* \* \* \*